(12) United States Patent
Chandrasekaran et al.

(10) Patent No.: US 11,374,844 B2
(45) Date of Patent: Jun. 28, 2022

(54) METHODS AND SYSTEMS FOR SMART SENSOR IMPLEMENTATION WITHIN A NETWORK APPLIANCE DATA PLANE

(71) Applicant: Pensando Systems Inc., Milpitas, CA (US)

(72) Inventors: Varagur Chandrasekaran, Fremont, CA (US); Vipin Jain, San Jose, CA (US); Swaminathan Narayanan, San Jose, CA (US); Raghava Kodigenahalli Sivaramu, Fremont, CA (US); Venkatesh Srinivasan, San Jose, CA (US)

(73) Assignee: Pensando Systems, Inc., Milpitas, CA (US)

( * ) Notice: Subject to any disclaimer, the term of this patent is extended or adjusted under 35 U.S.C. 154(b) by 0 days.

(21) Appl. No.: 16/990,931

(22) Filed: Aug. 11, 2020

(65) Prior Publication Data

US 2022/0052936 A1 Feb. 17, 2022

(51) Int. Cl.
| | |
|---|---|
| *G06F 15/173* | (2006.01) |
| *H04L 43/12* | (2022.01) |
| *H04L 43/16* | (2022.01) |
| *H04L 43/0888* | (2022.01) |
| *H04L 43/0817* | (2022.01) |
| *H04L 43/067* | (2022.01) |
| *H04L 43/08* | (2022.01) |

(52) U.S. Cl.
CPC ............ *H04L 43/12* (2013.01); *H04L 43/067* (2013.01); *H04L 43/08* (2013.01); *H04L 43/0817* (2013.01); *H04L 43/0888* (2013.01); *H04L 43/16* (2013.01)

(58) Field of Classification Search
CPC ..... H04L 43/12; H04L 43/16; H04L 43/0817; H04L 43/0888; H04L 43/067; H04L 43/08; H04L 43/0823
See application file for complete search history.

(56) References Cited

U.S. PATENT DOCUMENTS

| | | | |
|---|---|---|---|
| 2007/0081543 A1* | 4/2007 | Brenes | H04L 43/0888 370/401 |
| 2015/0120916 A1* | 4/2015 | Frattura | H04L 12/4641 709/224 |
| 2018/0255099 A1* | 9/2018 | Chen | H04L 67/10 |

OTHER PUBLICATIONS

InfiniBand Trade Association, "Annex A16: RDMA over Converged Ethernet (RoCE)", Supplement to InfiniBand™ Architecture Specification, vol. 1 Release 1.2.1, Apr. 6, 2010, 19 pgs.

(Continued)

*Primary Examiner* — Anh Nguyen
(74) *Attorney, Agent, or Firm* — Loza & Loza LLP

(57) ABSTRACT

A network appliance having a control plane and a data plane can process substantially every input packet at wire speed in a programmable packet processing pipeline of the data plane. Sensors, which can be processes implemented within the pipeline, can measure parameters of the network traffic flows and of the network appliance in accordance with monitoring policies. Reporting policies can be triggered when any one of many criteria are met by the parameters. The reporting policy can result in a report being sent to an outside recipient. Alternatively, the reporting policy can result in the network appliance implementing additional monitoring or reporting policies.

16 Claims, 20 Drawing Sheets

(56) References Cited

OTHER PUBLICATIONS

InfiniBand Trade Association, "Annex A17: RoCEv2", Supplement to InfiniBand™ Architecture Specification, vol. 1 Release 1.2.1, Apr. 6, 2010, 19 pgs.
Trisul, "Configuring ERSPAN packet capture for Network Security Monitoring", https://www.trisul.org/devzone/doku.php/hardware:erspan, retrieved Jul. 1, 2020, 3 pgs.
NVM Express, "NVM Express™ over Fabrics", Revision 1.1, Oct. 22, 2019, 83 pgs.
Sivaraman, Andirudh et al. "DC.p4: Programming the Forwarding Plane of a Data-Center Switch", 2015, 8 pgs.

* cited by examiner

| | Flow Monitoring Policies | |
|---|---|---|
| Monitoring Policy 1 | Calculate TCP-BW every 10 seconds | |
| Monitoring Policy 2 | Calculate TCP-BW every 10 seconds | |
| Monitoring Policy 3 | Calculate TCP-RTT every 10 seconds | |
| Monitoring Policy 4 | Calculate TCP-Open-Connections every 10 seconds | |
| Monitoring Policy 5 | Calculate TCP-Connection-Rate every 10 seconds | |
| Monitoring Policy 6 | Calculate TCP-SYN Rate every 10 seconds | |
| Monitoring Policy 7 | Calculate TCP-Connection-Setup-Latency every 10 seconds | |
| Monitoring Policy 8 | Calculate TCP-Connection-Close-Latency every 10 seconds | |
| Monitoring Policy 9 | Calculate TCP-BW every 1 second | |
| Monitoring Policy 10 | Calculate TCP-PPS every 1 second | |
| Monitoring Policy 11 | Calculate TCP-RTT every 1 second | |
| Monitoring Policy 12 | Calculate TCP-Open-Connections every 1 second | |
| Monitoring Policy 13 | Calculate TCP-Connection-Rate every 1 second | |
| Monitoring Policy 14 | Calculate TCP-SYN Rate every 1 second | |
| Monitoring Policy 15 | Calculate TCP-Connection-Setup-Latency every 1 second | |
| Monitoring Policy 16 | Calculate TCP-Connection-Close-Latency every 1 second | |
| Monitoring Policy 17 | Calculate TCP-BW between IP_Addr1 and IP_Addr2 port N every 1 second | |
| Monitoring Policy 18 | {Operation} {Metric} {Context} at (Rate) | |

FIG. 15

| Reporting Policies | |
|---|---|
| Report Policy 1 (Throughput Visibility) | send {TCP-BW Histogram, TCP-PPS histogram} to {email address1} |
| Report Policy 2 (Latency Visibility) | send {TCP-RTT value, TCP-Connection-Setup-Latency value, TCP-Connection-Close-Latency value, Triggered Constraint} to {URL 1} |
| Report Policy 3 (Slow Rate Attack Visibility) | send {TCP-Open-Connections histogram, TCP-Connection-Rate histogram} to {Service1 at Destination IPaddr1} |
| Report Policy 4 (High Rate Attack Visibility) | send {TCP-SYN Rate histogram, TCP-Connection-Rate histogram} to {Service1 at Destination IPaddr2} |
| Report Policy 5 (Mirror Traffic Flow) | Mirror {Specified Traffic Flow} to {Port1 at Destination IPaddr2} |
| Report Policy 6 (Generic Example) | send {DefinedReport or Metric} to {Recipient_Address} |

FIG. 16

Constraint-Action Table — 1801

| Constraint | Policy Triggered when Constraint is Met |
|---|---|
| TCP-BW > 50Mbps OR TCP-PPS > 100 | Report Policy 1 |
| TCP-RTT > 10 msecs | Report Policy 2 |
| TCP-Open-Connections > 100K AND TCP-Connection-Rate < 100/sec | Report Policy 3 |
| TCP-SYN Rate > 10K AND TCP-Connection-Rate < 100/sec | Report Policy 4 |
| TCP-Connection-Setup-Latency > 5 msecs OR TCP-Connection-Close-Latency > 5 msecs | Report Policy 2 |
| TCP-BW > 50Mbps OR TCP-PPS > 100 | Monitoring Policy 9 and Monitoring Policy 10 |
| TCP-BW < 30Mbps AND TCP-PPS < 50 | Monitoring Policy 1 and Monitoring Policy 2 |
| TCP-Open-Connections > 100K AND TCP-Connection-Rate < 100/sec | Monitoring Policy 12 and Monitoring Policy 13 |
| TCP-Open-Connections < 30K OR TCP-Connection-Rate > 300/sec | Monitoring Policy 4 and Monitoring Policy 5 |
| TCP-SYN Rate > 10K AND TCP-Connection-Rate < 100/sec | Monitoring Policy 14 and Monitoring Policy 13 |
| TCP-SYN Rate < 7K AND TCP-Connection-Rate > 300/sec | Monitoring Policy 6 and Monitoring Policy 5 |
| TCP-Connection-Setup-Latency > 5 msecs OR TCP-Connection-Close-Latency > 5 msecs | Monitoring Policy 14 and Monitoring Policy 13 |
| TCP-Connection-Setup-Latency < 3 msecs AND TCP-Connection-Close-Latency < 3 msecs | Monitoring Policy 14 and Monitoring Policy 13 |
| {Metric}in{Context} {comparison} { value } is true | {Policy} in {Context} |

FIG. 17

METHODS AND SYSTEMS FOR SMART SENSOR IMPLEMENTATION WITHIN A NETWORK APPLIANCE DATA PLANE

TECHNICAL FIELD

The embodiments relate to computer networks, network appliances, network switches, network routers, data planes, control planes, device and traffic flow sensors installed in data planes, and to implementing data plane sensors in response to measured parameters.

BACKGROUND

In data networks, network appliances such as switches, routers, and network interface cards receive packets at input interfaces, process the received packets, and then forward the packets to one or more output interfaces. It is important that such network appliances operate as quickly as possible in order to keep pace with a high rate of incoming packets. One challenge associated with network appliances relates to providing the flexibility to adapt to changes in desired feature sets, networking protocols, operating systems, applications, and hardware configurations.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method implemented by a network appliance. The method can include receiving a plurality of input packets of a plurality of network traffic flows and transmitting a plurality of output packets of the plurality a network traffic flows, wherein a data plane of the network appliance is configured to generate the plurality of output packets by processing the plurality of input packets. The method can additionally include monitoring the plurality of network traffic flows, wherein the data plane is configured to monitor the plurality of network traffic flows in accordance with a flow monitoring policy and is configured to measure a flow metric of the plurality of network traffic flows in accordance with the flow monitoring policy. The method can further include triggering a reporting policy, wherein the data plane is configured to trigger the reporting policy in response to determining that a criterion associated with the flow metric is met by at least one of the plurality of network traffic flows. The method can yet further include transmitting at least one flow reporting packet, wherein the network appliance is configured to transmit the at least one flow reporting packet to a flow diagnostic recipient in accordance with the reporting policy.

Another aspect of the subject matter described in this disclosure can be implemented in a network appliance. The network appliance can include a control plane configured to control a data plane, and the data plane. The data plane can be configured to receive a plurality of input packets of a plurality of network traffic flows, process the plurality of input packets to produce a plurality of output packets of the plurality of network traffic flows, and transmit the plurality of output packets of the plurality a network traffic flows. The data plane can also be configured to monitor the plurality of network traffic flows in accordance with a flow monitoring policy, measure a flow metric of the plurality of network traffic flows in accordance with the flow monitoring policy, trigger a reporting policy in response to determining that a criterion associated with the flow metric is met by at least one of the plurality of network traffic flows, and send a at least one flow reporting packet to a flow diagnostic recipient in accordance with the reporting policy.

Yet another aspect of the subject matter described in this disclosure can be implemented in a network appliance. The network appliance can include a means for receiving a plurality of input packets of a plurality of network traffic flows, a means for transmitting a plurality of output packets of the plurality a network traffic flows, a means for producing the plurality of output packets, and a means for monitoring the plurality of network traffic flows in accordance with a flow monitoring policy. The network appliance can also include a means for measuring a flow metric of at least one of the plurality of network traffic flows in accordance with the flow monitoring policy, a means for determining that a criterion is met by at least one of the plurality of network traffic flows, a means for triggering a reporting policy in response to determining that the criterion is met by at least one of the plurality of network traffic flows, and a means for reporting to a recipient in accordance with the reporting policy.

In some implementations of the methods and devices, the data plane includes a timer block that produces a time value, and the data plane is configured to use the time value to measure the flow metric. The timer block can be implemented via special purpose hardware, and can be configured to produce a time value.

In some implementations of the methods and devices, the data plane can include special purpose hardware implementing a match action pipeline configured to monitor the plurality of network traffic flows in accordance with the flow monitoring policy. In addition, data plane can be configured to determine that the criterion associated with the flow metric is met by at least one of the plurality of network traffic flows.

In some implementations of the methods and devices, the data plane is configured to monitor the data plane in accordance with a device monitoring policy by determining a device metric of the data plane in accordance with the device monitoring policy, and trigger a second reporting policy in response to determining that a second criterion is met by the data plane, wherein the network appliance is configured to send at least one device reporting packet to a device diagnostic recipient in accordance with the second reporting policy.

In some implementations of the methods and devices, the data plane includes special purpose hardware implementing a match action pipeline configured to monitor the plurality of network traffic flows in accordance with an initial flow monitoring policy associated with the flow metric, trigger the flow monitoring policy in response to determining that an initial criterion is met by at least one of the plurality of network traffic flows, and initiate monitoring the plurality of network traffic flows in accordance with the flow monitoring policy.

In some implementations of the methods and devices, the data plane includes special purpose hardware implementing a match-action pipeline configured to monitor the plurality of network traffic flows in accordance with an initial flow monitoring policy associated with the flow metric, trigger the flow monitoring policy in response to determining that an initial criterion is met by at least one of the plurality of network traffic flows, and initiate monitoring the plurality of network traffic flows in accordance with the flow monitoring policy.

In some implementations of the methods and devices, the initial criterion is associated with the flow metric. In some implementations of the methods and devices, the at least one flow reporting packet includes a diagnostic flow that mirrors at least one of the plurality of network traffic flows.

In some implementations of the methods and devices, the data plane is configured to produce an aggregation of a parameter by aggregating the parameter over time in accordance with the flow monitoring policy. In some implementations of the methods and devices, the aggregation of the parameter is transmitted to the flow diagnostic recipient via the at least one flow reporting packet.

In some implementations of the methods and devices, the control plane configures the data plane to implement the flow monitoring policy and the reporting policy.

In some implementations of the methods and devices, the data plane comprises special purpose hardware implementing a timer block and a match-action pipeline. The match-action pipeline can be configured to produce an aggregation of the flow metric using the timer block by aggregating the flow metric over time in accordance with the flow monitoring policy, wherein the aggregation of the flow metric is sent to the flow diagnostic recipient via the at least one flow reporting packet.

In some implementations of the methods and devices, the data plane comprises special purpose hardware implementing a match-action pipeline. The match-action pipeline can be configured to produce an aggregation of the flow metric in accordance with the flow monitoring policy, wherein the aggregation of the flow metric is sent to the flow diagnostic recipient via the at least one flow reporting packet.

In some implementations of the methods and devices, the network appliance further comprises special purpose hardware implementing the means for producing the plurality of output packets, the means for monitoring the plurality of network traffic flows, the means for measuring the flow metric, the means for determining that the criterion is met by at least one of the plurality of network traffic flows, and the means for triggering the reporting policy.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 15 is a high-level diagram illustrating a non-limiting example of flow monitoring policies that can be implemented by a data plane according to some aspects.

FIG. 16 is a high-level diagram illustrating a non-limiting example of reporting policies that can be implemented by a data plane according to some aspects.

FIG. 17 is a high-level diagram illustrating a non-limiting example of a constraint-action table that can be implemented by a data plane according to some aspects.

Throughout the description, similar reference numbers may be used to identify similar elements.

DETAILED DESCRIPTION

Figure 1:
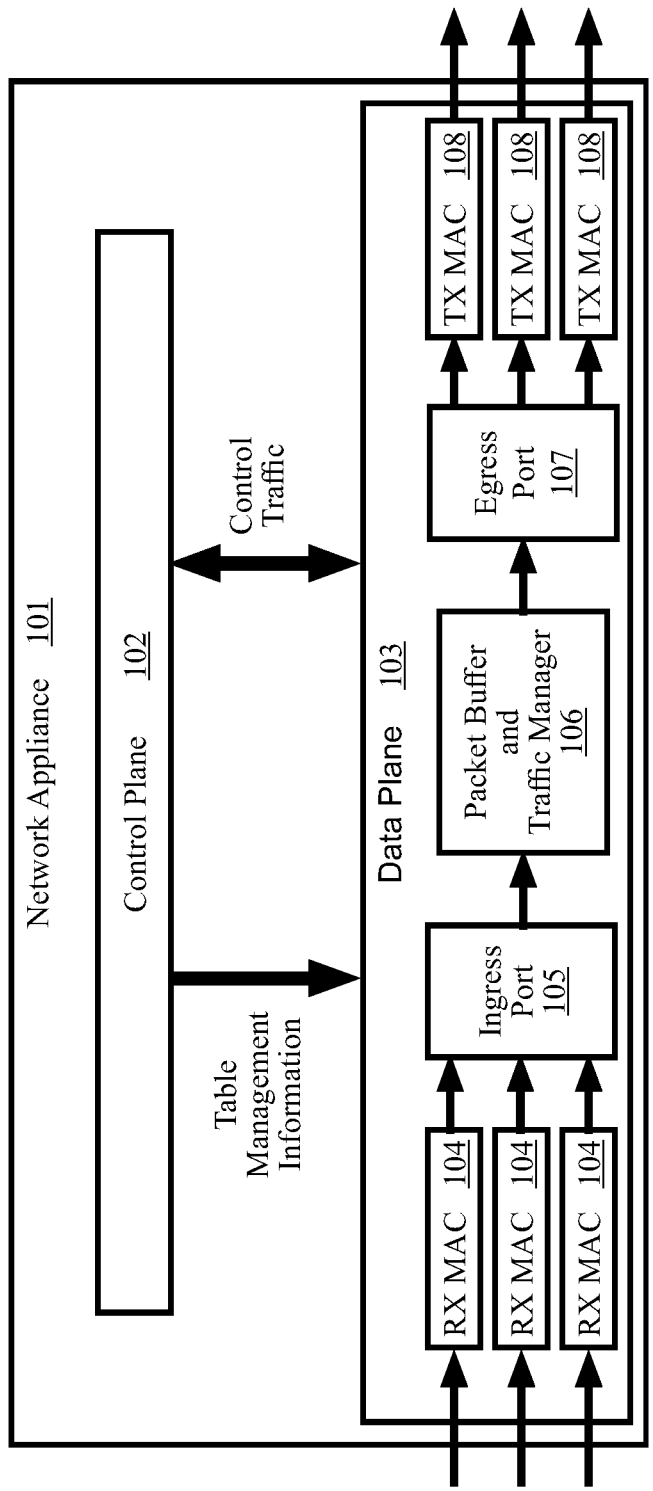
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In the field of data networking, the functionality of network appliances such as switches, routers, and network interface cards (NICs) is often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Data plane smart sensing is an advance over conventional ERSPAN (encapsulated remote switched port analyzer) traffic mirroring. Conventional traffic mirroring mirrors network traffic flows to a recipient system for storage and offline analysis. Aspects of the programmable pipeline circuits disclosed herein provide for performing advanced analysis within the data plane of a network appliance without conventional ERSPAN style traffic mirroring or storage. The data plane can process a majority of packets passing through the network appliance and can perform that processing at wire speed. Implementing traffic flow monitoring within the data plane enables collection of traffic flow metrics without the need for traffic flow mirroring and at wire speed. Smart sensing at the data plane provides for automatically and nearly instantaneously adapting the traffic monitoring based on current traffic flow properties and for automatically reporting traffic flow anomalies or suspicious conditions when such anomalies and conditions are detected.

Advantages of smart sensing at the data plane include reducing or eliminating the need for a separate traffic flow collection and analysis system and reducing or eliminating consumption of precious network bandwidth with traffic flow mirrors. The data plane, which normally processes each packet, is augmented to adaptively monitor the network traffic, to store traffic flow metrics, to report anomalies, and to thereby perform tasks otherwise performed via off line processing. Another advantage is that network monitoring can adapt nearly instantly to observed suspicious conditions. For example, as soon as a suspected DDOS (distributed denial of service) attack on a target is detected, the data plane monitoring can, without delay for offline analysis or reaction, be focused on the DDOS attack of that target and can report details of the DDOS attack. The reported details can include identifying the target, packet/bandwidth statistics, histograms, etc. Furthermore, the data plane can notice and focus on the early phases of an attack by immediately focusing on the attack. This is an advance over techniques in which the attack is first suspected by personnel analyzing streams mirrored to an analysis system, who may then delve further into the suspected attack via mirroring more or different streams in an attempt to confirm the attack and to identify the target.

FIG. 1 is a functional block diagram of a network appliance 101 having a control plane 102 and a data plane 103 and in which aspects may be implemented. As illustrated in FIG. 1, the control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. In some embodiments, the control plane may implement operations related to packet routing that include Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). In some embodiments, the data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

Often times, the high-volume and rapid decision-making that occurs at the data plane is implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P4$_{16}$Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 104, an ingress port 105, a packet buffer/traffic manager 106, an egress port 107, and multiple transmit MACs (TX MAC) 108. The data plane elements described may be implemented, for example, as a P4 programmable switch architecture (PSA) or as a P4 programmable NIC, although architectures other than a PSA and a P4 programmable NIC are also possible.

The RX MAC 104 implements media access control on incoming packets via, for example, a MAC protocol such as Ethernet. In an embodiment, the MAC protocol is Ethernet and the RX MAC is configured to implement operations related to, for example, receiving frames, half-duplex retransmission and backoff functions, Frame Check Sequence (FCS), interframe gap enforcement, discarding malformed frames, and removing the preamble, Start Frame Delimiter (SFD), and padding from a packet. Likewise, the TX MAC 108 implements media access control on outgoing packets via, for example, Ethernet. In an embodiment, the TX MAC is configured to implement operations related to, for example, transmitting frames, half-duplex retransmission and backoff functions, appending an FCS, interframe gap enforcement, and prepending a preamble, an SFD, and padding. The packet buffer/traffic manager 106 includes memory and/or logic to implement packet buffering and/or traffic management. In an embodiment, operations implemented via the packet buffer/traffic manager include, for example, packet buffering, packet scheduling, and/or traffic shaping.

The ingress port 105 and egress port 107 can be packet processing pipelines that operate at the data plane of a network appliance and can be programmable via a domain-specific language such as P4. In an embodiment, the ingress port 105 and egress port 107 can be programmed to implement various operations at the data plane such as, for example, routing, bridging, tunneling, forwarding, network access control lists (ACLs), Layer 4 (L4) firewalls, flow-based rate limiting, VLAN tag policies, group membership, isolation, multicast, group control, label push/pop operations, L4 load-balancing, L4 flow tables for analytics and flow specific processing, distributed denial of service (DDoS) attack detection, DDoS attack mitigation, and telemetry data gathering on any packet field or flow state.

FIGS. 2A-2H illustrate packet headers and payloads of packets 222, 223, 224, 225, 226 in a network traffic flow 200 that can be processed according to some aspects. A network traffic flow 200 can have numerous packets such as a first packet 222, a second packet 223, a third packet 224, a fourth packet 225, and a final packet 226 with many more packets between the fourth packet 225 and the final packet 226. The term "the packet" or "a packet" can refer to any of the packets in a network traffic flow.

In general, packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 104 as a raw bit stream or transmitted by TX MAC 108 as a raw bit stream. Packets and packet payloads can also be constructed and interpreted in accordance with protocols such as the Infiniband protocol suite.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 201 and layer 2 payload 202. The layer 2 header can contain a source MAC address 203, a destination MAC address 204, and other layer 2 header data 205. The input ports 104 and output ports 108 of a network appliance 101 can have MAC addresses. In some embodiments a network appliance 101 has a MAC address that is applied to all or some of the ports. In some embodiments one or more of the ports each have their own MAC address. In general, each port can send and receive packets. As such, a port of a network appliance can be configured with a RX MAC 104 and a TX MAC 108. Ethernet, also known as Institute of Electrical and Electronics Engineers (IEEE) 802.3 is a layer 2 protocol. IEEE 802.11 (WiFi) is another widely used layer 2 protocol. The layer 2 payload 202 can include a Layer 3 packet.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 206 and a layer 3 payload 207. The layer 3 header 206 can have a source IP address 208, a destination IP address 209, a protocol indicator 210, and other layer 3 header data 211. As an example, a first node can send an IP packet to a second node via an intermediate node. The IP packet therefor has a source IP address indicating the first node and a destination IP address indicating the second node. The first node makes a routing decision that the IP packet should be sent to the intermediate node. The first node therefor sends the IP packet to the intermediate node in a first layer 2 packet. The first layer 2 packet has a source MAC address 203 indicating the first node, a destination MAC address 204 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 203 indicating the intermediate node, a destination MAC address 204 indicating the second node, and the IP packet as a payload. The layer 3 payload 207 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 206 using protocol indicator 210. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 207 includes a TCP header and a TCP payload. UDP can provide for computer applications to send messages, in this case referred to as datagrams, to other hosts on an IP network using a connectionless model. When carrying UDP data, a layer 3 payload 207 includes a UDP header and a UDP payload. ICMP is used by network devices, including routers, to send error messages and operational information indicating success or failure when communicating with another IP address. ICMP uses a connectionless model.

A layer 4 packet can have a layer 4 header 212 and a layer 4 payload 213. The layer 4 header 212 can include a source port 214, destination port 215, layer 4 flags 216, and other layer 4 header data 217. The source port and the destination port can be integer values used by host computers to deliver packets to application programs configured to listen to and send on those ports. The layer 4 flags 216 can indicate a status of or action for a network traffic flow. For example, TCP has the RST, FIN, and ACK flags. RST indicates a TCP connection is to be immediately shutdown and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 213 can contain a layer 7 packet.

The application layer, often called layer 7, includes the protocols used by most applications for providing user services or exchanging application data over the network connections established by the lower level protocols. Examples of application layer protocols include the Hypertext Transfer Protocol (HTTP), the File Transfer Protocol (FTP), the Simple Mail Transfer Protocol (SMTP), and the Dynamic Host Configuration Protocol (DHCP). Data coded according to application layer protocols can be encapsulated into transport layer protocol units (such as TCP or UDP messages), which in turn use lower layer protocols to effect actual data transfer.

A layer 7 packet may have layer 7 header data 218 and may have a layer 7 payload 221. In practice, many applications do not distinguish between headers and payloads at layer 7. HTTP is a protocol that may be considered to have headers and payloads. The illustrated layer 7 headers are for an HTTP GET 219 and for a response to an HTTP GET 220. The illustrated payload is that of the response to the HTTP GET.

Figure 2A:
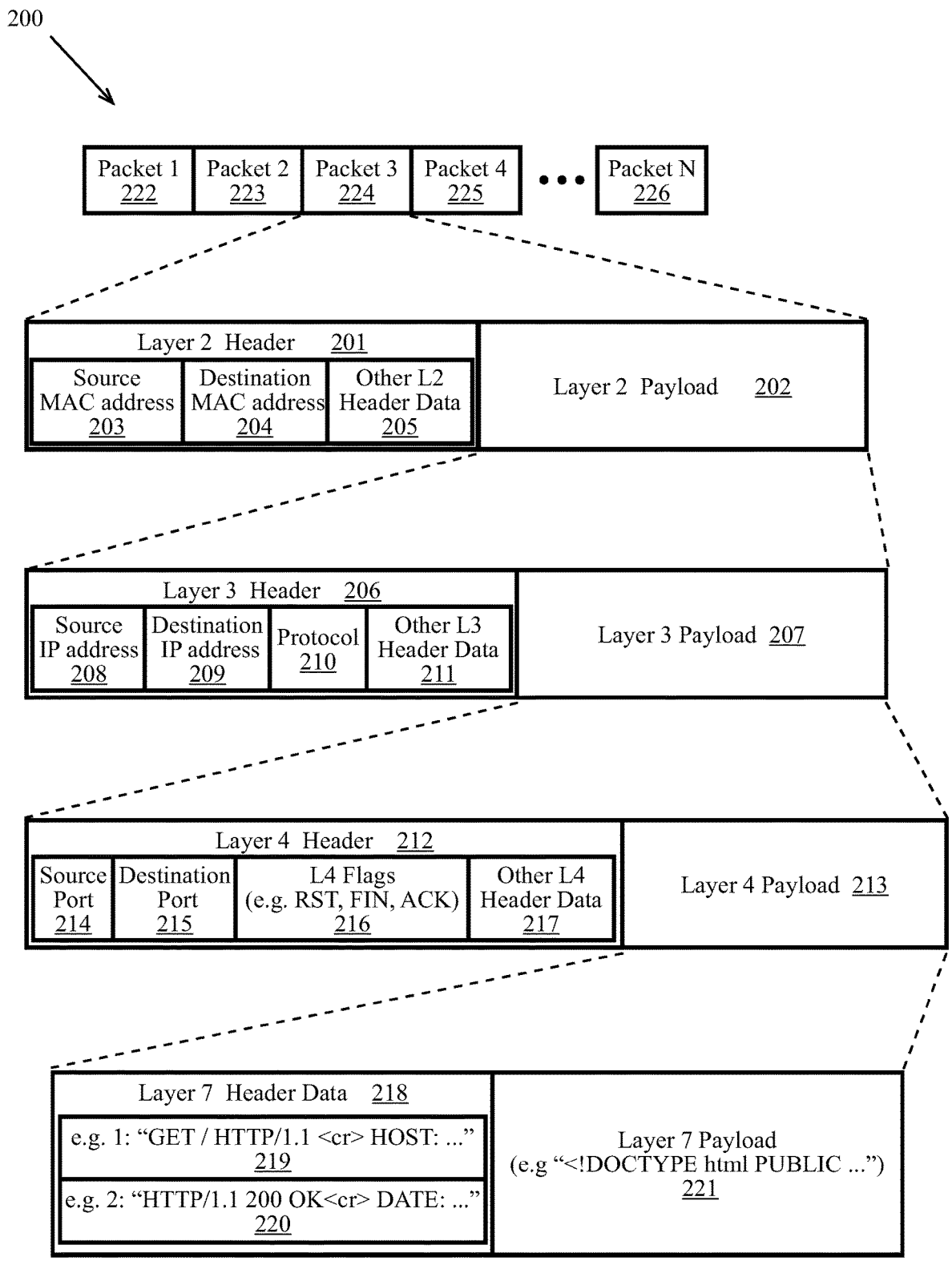
FIGS. 2A-2H illustrate packet headers and payloads of packets in a network traffic flow that can be processed according to some aspects.
Figure 2B:
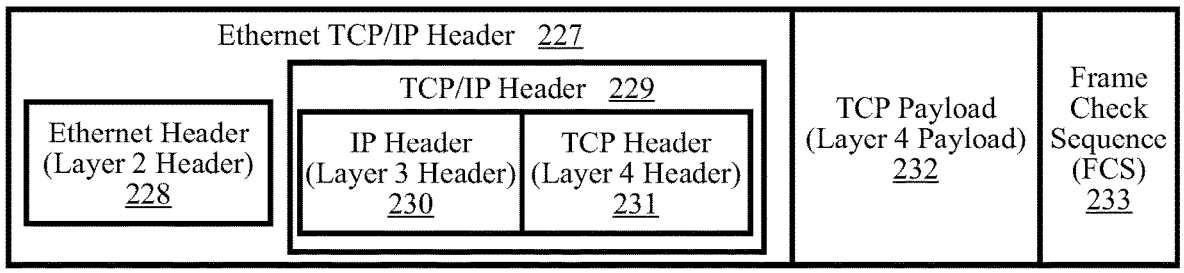
Figure 2C:
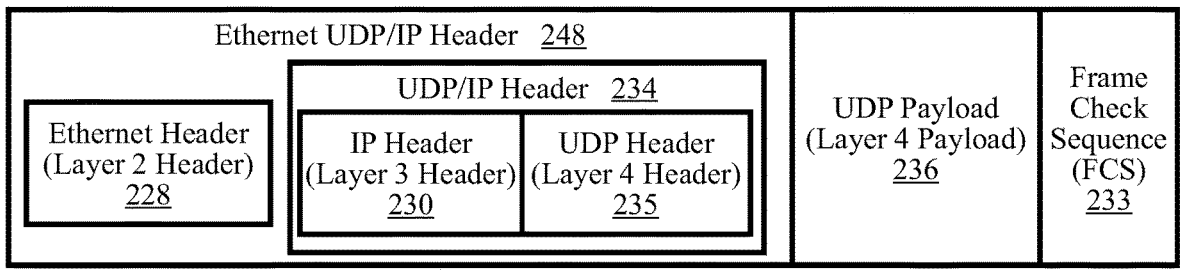

FIGS. 2B and 2C illustrate TCP/IP and UDP/IP Ethernet packets. Ethernet packets, such as TCP/IP and UDP/IP Ethernet packets, have an Ethernet header 228 and a frame check sequence (FCS) 233. As discussed above, Ethernet is a layer 2 protocol. An Ethernet TCP/IP header 227 has an Ethernet header 228 and a TCP/IP header 229. The TCP/IP header 229 has an IP header 230 and a TCP header 231. The Ethernet TCP/IP packet has a TCP payload 232 as the layer 4 payload. An Ethernet UDP/IP packet differs from an Ethernet TCP/IP packet by having UDP as the layer 4 protocol. The Ethernet UDP/IP header 248 has an Ethernet header 228 and a UDP/IP header 234. The UDP/IP header 234 has an IP header 230 and a UDP header 235. The Ethernet UDP/IP packet has a UDP payload 236 as the layer 4 payload.

NVMe (non-volatile memory express) is a communications protocol that has been used between host controllers and non-volatile storage devices. NVMe was originally designed for carrying commands and data between storage controllers and non-volatile storage devices attached to the same PCIe bus. NVMe over Fabric (NVMe-oF) is a technology the adapts NVMe for connecting storage controllers and non-volatile storage devices connected over a network. Implementations of NVMe-oF include NVMe/TCP and NVMe/RoCE. (RDMA (remote direct memory access) over Converged Ethernet). There are currently two versions of NVMe/RoCE, NVMe/RoCE v1 and NVMe/RoCE v2. NVMe-oF is defined in "NVM Express over Fabrics," version 1.1, as published by NVM Express, Inc. on Oct. 22, 2019. NVM Express, Inc. is an organization that includes hardware and software companies implementing NVMe and NVMe-oF. RoCE is defined in "Supplement to InfiniBand Architecture Specification Volume 1 Release 1.2.1, Annex 16 RDMA over Converged Ethernet (RoCE)" as published by the Infiniband Trade Association on Apr. 6, 2010. RoCE v2 is defined in "Supplement to InfiniBand Architecture Specification Volume 1 Release 1.2.1, Annex 17 RoCEv2" as published by the Infiniband Trade Association on Sep. 2, 2014.

Figure 2D:
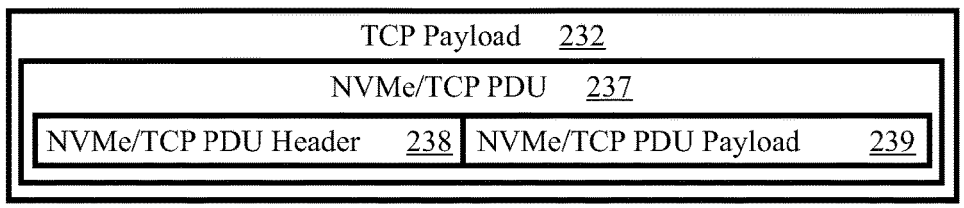
Figure 2E:
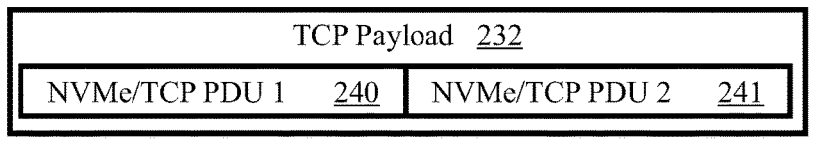
Figure 2F:
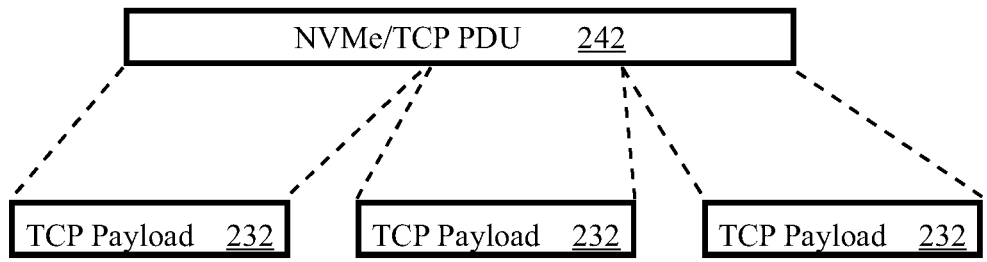

FIGS. 2D-2F illustrate the TCP payloads 232 of NVME/TCP packets. FIG. 2D illustrates a TCP payload 232 having a single NVMe/TCP PDU (Protocol Data Unit) 237. The NVMe/TCP PDU 237 can be considered a layer 4 payload. The NVMe/TCP PDU 237 can include a NVMe/TCP PDU header 238 and a NVMe/TCP PDU payload 239. FIG. 2E illustrates a single TCP/IP payload 232 having multiple NVMe/TCP PDUs, NVMe/TCP PDU 1 240 and NVMe/TCP PDU 2 241. FIG. 2F illustrates multiple TCP payloads 232 of multiple TCP packets carrying a single NVMe/TCP PDU 242.

Figure 2G:
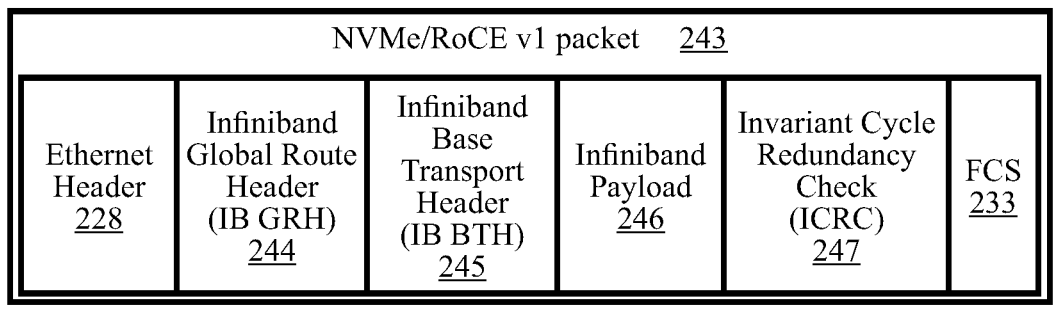

FIG. 2G illustrates a NVMe/RoCE v1 packet 243. The NVMe/RoCE v1 packet 243 can be seen to be an ethernet packet having an Ethernet payload that includes an Infiniband Global Route Header (IB GRH) 244, an Infiniband Base Transport Header (IB BTH) 245, an Infiniband payload 246, and an Invariant Cyclic Redundancy Check (ICRC) 247 field.

Figure 2H:
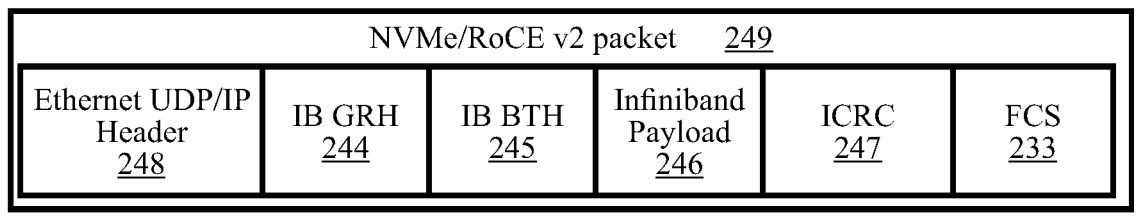

FIG. 2H illustrates a NVMe/RoCE v2 packet 249. The NVMe/RoCE v2 packet 249 can be seen to be an Ethernet UDP/IP packet having a UDP payload that includes the IB GRH 244, the IB BTH 245, the Infiniband payload 246, and the ICRC 247. Here, Ethernet is the layer 2 transport for a UDP packet carrying the Infiniband elements. Other layer 2 protocols may be used as the layer 2 transport.

Figure 3:
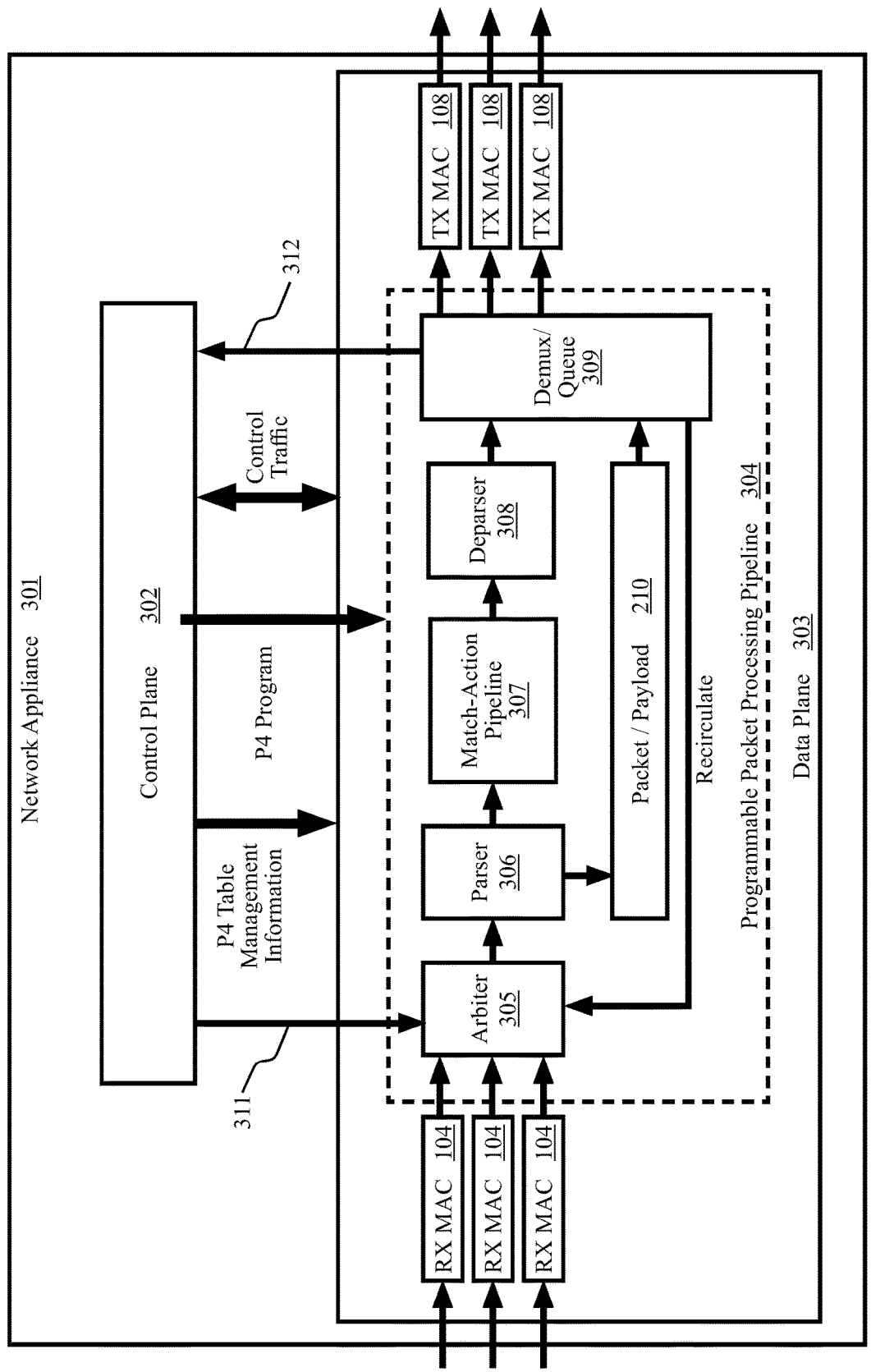
FIG. 3 is a depiction of a network appliance in which the data plane is programmable according to the P4 domain-specific language and in which aspects may be implemented.

FIG. 3 is a depiction of a network appliance 301 in which the data plane 303 is programmable according to the P4 domain-specific language and in which aspects may be implemented. As illustrated in FIG. 3, a P4 program is provided to the data plane via the control plane 302. The P4 program includes software code that configures the functionality of the data plane to implement particular processing and/or forwarding logic and processing and/or forwarding tables are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane and the data plane corresponds to a class of algorithms that describe transformations on packets by packet processing systems.

The data plane 303 includes a programmable packet processing pipeline 304 that is programmable using a domain-specific language such as P4 and that can be used to implement the programmable packet processing pipeline 304. As described in the P4 specification, a programmable packet processing pipeline can include an arbiter 305, a parser 306, a match-action pipeline 307, a deparser 308, and a demux/queue 309. The arbiter 305 can act as an ingress unit receiving packets from RX-MACs 104 and can also receive packets from the control plane via a control plane packet input 311. The arbiter 305 can also receive packets that are recirculated to it by the demux/queue 309. The demux/queue 309 can act as an egress unit and can also be configured to send packets to a drop port (the packets thereby disappear), to the arbiter via recirculation, and to the control plane 302 via an output CPU port. The control plane is often referred to as a CPU (central processing unit) although, in practice, control planes often include multiple CPU cores and other elements. The arbiter 305 and the demux/queue 309 can be configured through the domain-specific language (e.g., P4).

The parser 306 is a programmable element that is configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. In an embodiment, the information extracted from a packet by the parser is referred to as a packet header vector or "PHV." In an embodiment, the parser identifies certain fields of the header and extracts the data corresponding to the identified fields to generate the PHV. In an embodiment, the PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 308 is a programmable element that is configured through the domain-specific language (e.g., P4) to generate packet headers from PHVs at the output of match-action pipeline 307 and to construct outgoing packets by reassembling the header(s) (e.g., Ethernet and IP headers) as determined by the match-action pipeline. In some cases, a packet payload may travel in a separate queue or buffer, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager (e.g. FIG. 1, element 106) for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 308) before the demux/queue 309 sends the packet to the TX MAC 108 or recirculates it back to the arbiter 305 for additional processing.

Figure 4:
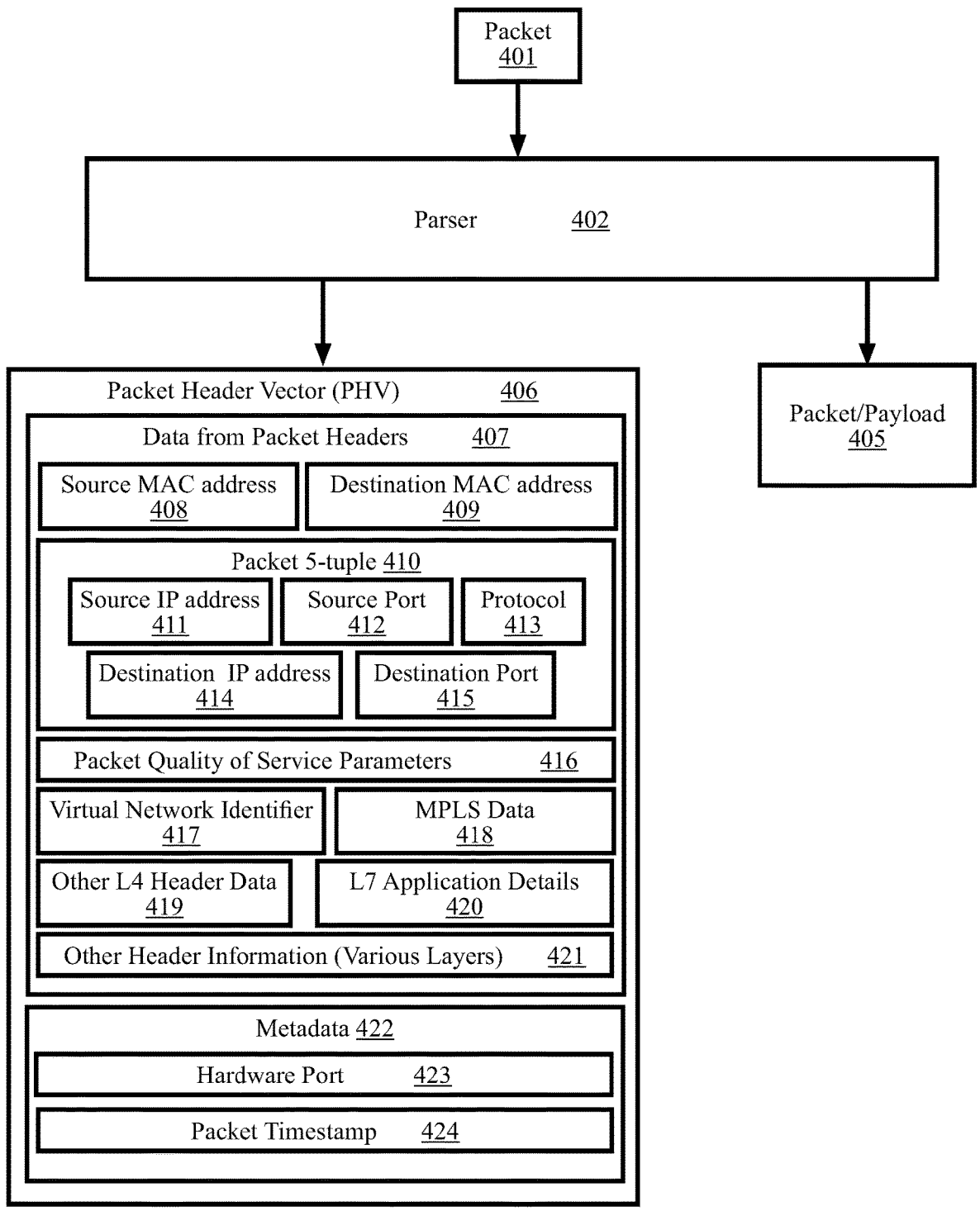
FIG. 4 is a high-level diagram illustrating an example of generating a packet header vector from a packet according to some aspects.

FIG. 4 is a high-level diagram illustrating an example of generating a packet header vector 406 from a packet 401 according to some aspects. The parser 402 can receive a packet 401 that has layer 2, layer 3, layer 4, and layer 7 headers and payloads. The parser can generate a packet header vector (PHV) from packet 401. The packet header vector can include many data fields including data from packet headers 407 and metadata 422. The metadata 422 can include data generated by the network appliance such as the hardware port 423 on which the packet 401 was received and the packet timestamp 424 indicating when the packet 401 was received by the network appliance.

The source MAC address 408 can be obtained from the layer 2 header 201. The destination MAC address 409 can be obtained from the layer 2 header 201. The source IP address 411 can be obtained from the layer 3 header 206. The source port 412 can be obtained from the layer 4 header 212. The protocol 413 can be obtained from the layer 3 header 206. The destination IP address 414 can be obtained from the layer 3 header 206. The destination port 415 can be obtained from the layer 4 header 212. The packet quality of service parameters 416 can be obtained from the layer 3 header 206 or another header based on implementation specific details. The virtual network identifier 417 may be obtained from the layer 2 header 201. The multi-protocol label switching (MPLS) data 418, such as an MPLS label, may be obtained from the layer 2 header 201. The other layer 4 data 419 can be obtained from the layer 4 header 212. The layer 7 application details 420 can be obtained from the layer 7 header 218 and layer 7 payload 221. The other header information 421 is the other information contained in the layer 2, layer 3, layer 4, and layer 7 headers.

The packet 5-tuple 410 is often used for generating keys for match tables, discussed below. The packet 5-tuple 410 can include the source IP address 411, the source port 412, the protocol 413, the destination IP address 414, and the destination port 415.

Those practiced in computer networking protocols realize that the headers carry much more information than that described here, realize that substantially all of the headers are standardized by documents detailing header contents and fields, and know how to obtain those documents. The parser can also be configured to output a packet or payload 405. Recalling that the parser 402 is a programmable element that is configured through the domain-specific language (e.g., P4) to extract information from a packet, the specific contents of the packet or payload 405 are those contents specified via the domain specific language. For example, the contents of the packet or payload 405 can be the layer 3 payload.

Figure 5:
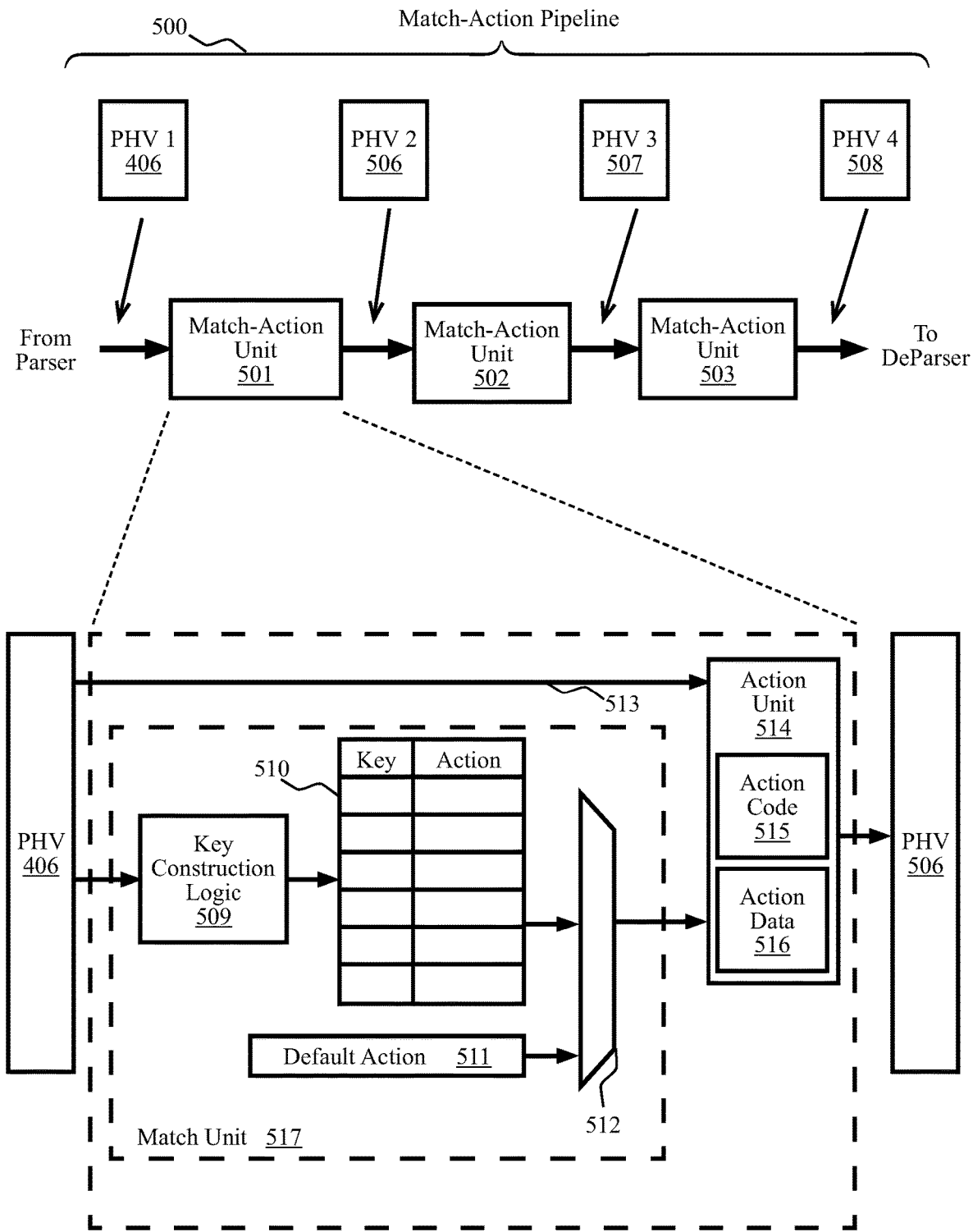
FIG. 5 is a functional block diagram illustrating an example of a match-action unit in a match-action pipeline according to some aspects.

FIG. 5 is a functional block diagram illustrating an example of a match-action unit 501 in a match-action pipeline 500 according to some aspects. FIG. 5 introduces certain concepts related to match-action units and match-action pipelines and is not intended to be limiting. The match-action units 501, 502, 503 of the match-action pipeline 500 are programmed to perform "match-action" operations in which a match unit performs a lookup using at least a portion of the PHV and an action unit performs an action based on an output from the match unit. In an embodiment, a PHV generated at the parser is passed through each of the match-action units in the match-action pipeline in series and each match-action unit implements a match-action operation. The PHV and/or table entries may be updated in each stage of match-action processing according to the actions specified by the P4 programming In some instances, a packet may be recirculated through the match-action pipeline, or a portion thereof, for additional processing. Match-action unit 1 501 receives PHV 1 406 as an input and outputs PHV 2 506. Match-action unit 2 502 receives PHV 2 506 as an input and outputs PHV 3 507. Match-action unit 3 503 receives PHV 3 507 as an input and outputs PHV 4 508.

An expanded view of elements of a match-action unit 501 of match-action pipeline 500 is shown. The match-action unit includes a match unit 517 (also referred to as a "table engine") that operates on an input PHV 406 and an action unit 514 that produces an output PHV 506, which may be a modified version of the input PHV 406. The match unit 517 can include key construction logic 509, a lookup table 510, and selector logic 512. The key construction logic 509 is configured to generate a key from at least one field in the PHV. The lookup table 510 is populated with key-action pairs, where a key-action pair includes a key (e.g., a lookup key) and corresponding action code 515 and/or action data 516. In an embodiment, a P4 lookup table generalizes traditional switch tables, and can be programmed to implement, for example, routing tables, flow lookup tables, ACLs, and other user-defined table types, including complex multi-variable tables. The key generation and lookup function constitutes the "match" portion of the operation and produces an action that is provided to the action unit via the selector logic. The action unit executes an action over the input data (which may include data 513 from the PHV) and provides an output that forms at least a portion of the output PHV. For example, the action unit executes action code 515 on action data 516 and data 513 to produce an output that is included in the output PHV. If no match is found in the lookup table, then a default action 511 may be implemented. A flow miss is example of a default action that may be executed when no match is found. In an embodiment, operations of the match-action unit are programmable in the control plane via P4 and the contents of the lookup table is managed by the control plane.

Figure 6:
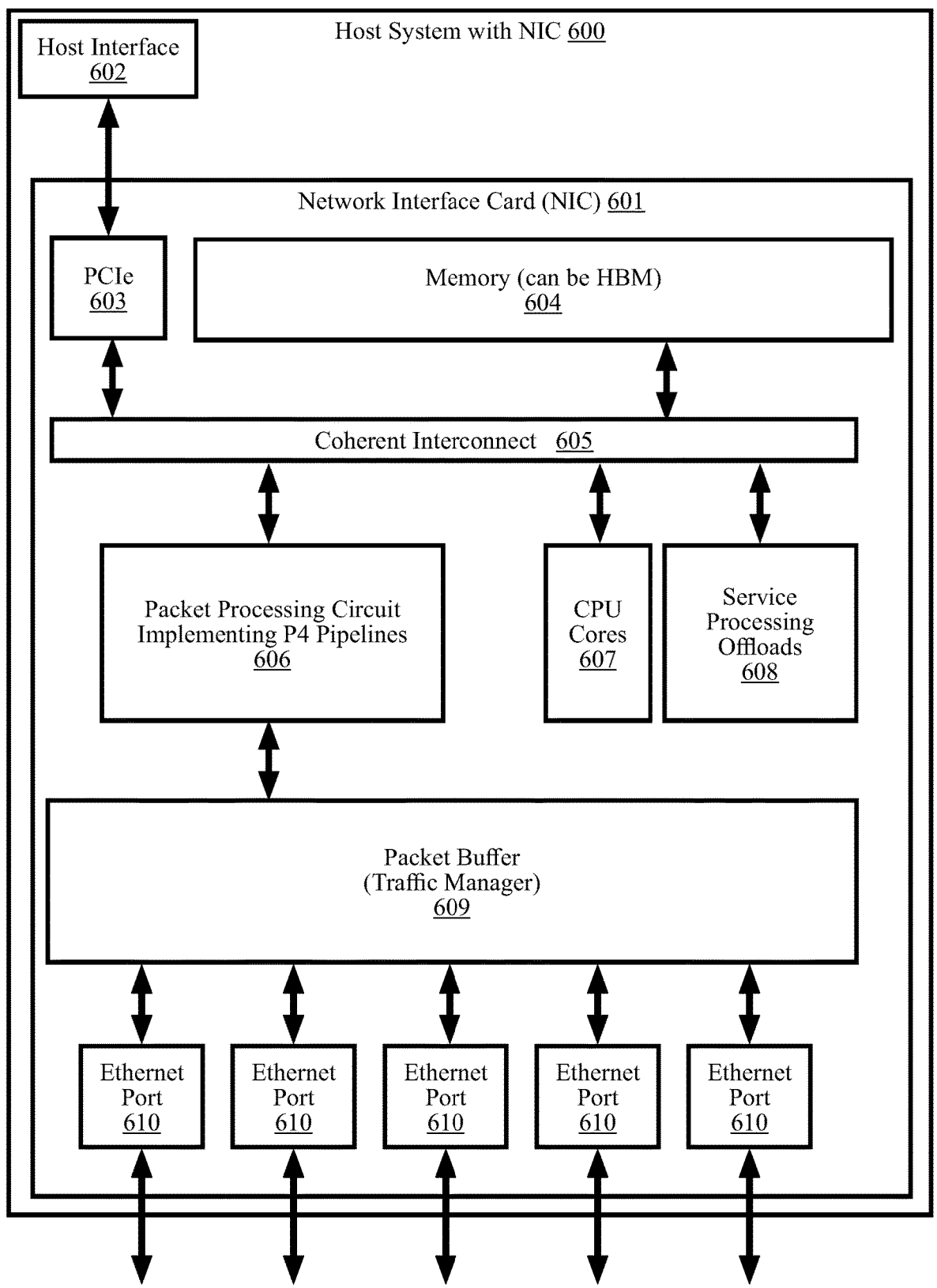
FIG. 6 is a high-level diagram of a network interface card configured as a network appliance according to some aspects.

FIG. 6 is a high-level diagram of a network interface card (NIC) 601 configured as a network appliance according to some aspects. Aspects of the embodiments, including packet processing pipelines, fast data paths, and slow data paths, can be implemented in the NIC 601. The NIC 601 can be configured for operation within a host system 600. The host system can be a general-purpose computer with a host interface 602 such as a PCIe interface. The NIC 601 can have a PCIe interface 603 through which it can communicate with the host system 600. The NIC can also include a memory 604, a coherent interconnect 605, a packet processing circuit implementing P4 pipelines 606, CPU cores 607, service processing offloads 608, packet buffer 609, and ethernet ports 610.

As discussed above, the P4 pipelines are configured for programming via a P4 domain-specific language for programming the data plane of network appliances that is currently defined in the "P4$_{16}$ Language Specification," version 1.2.0, as published by the P4 Language Consortium on Oct. 23, 2019. As such, the P4 pipeline's inputs, outputs, and operations may be constrained such that the P4 pipeline operates in accordance with the P4 language specification. The P4+ pipeline may be similar to a P4 pipeline bit is not constrained as the P4 pipeline is.

The NIC 601 can include a memory 604 for running Linux or some other operating system, for storing large data structures such as flow tables and other analytics, and for providing buffering resources for advanced features including TCP termination and proxy, deep packet inspection, storage offloads, and connected FPGA functions. The memory system may comprise a high bandwidth module (HBM) module which may support 4 GB capacity, 8 GB capacity, or some other capacity depending on package and HBM. The HBM may be required for accessing full packets at wire speed. Wire speed refers to the speed at which packets can move through a communications network. For example, each of the ethernet ports can be a 100 Gbps port. Wire speed for the network appliance may therefore be operation at 100 Gbps for each port. HBMs operating at over 1 Tb/s are currently available.

In an embodiment, the CPU cores 607 are general purpose processor cores, such as ARM processor cores, Microprocessor without Interlocked Pipeline Stages (MIPS) processor cores, and/or x86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C.

In an embodiment, each CPU core 607 also includes a bus interface, internal memory, and a memory management unit (MMU) and/or memory protection unit. For example, the CPU cores may include internal cache, e.g., L1 cache and/or L2 cache, and/or may have access to nearby L2 and/or L3 cache. In an embodiment, each CPU core includes core-specific L1 cache, including instruction-cache and data-cache and L2 cache that is specific to each CPU core or shared amongst a small number of CPU cores. L3 cache may also be available to the CPU cores.

In an embodiment there are four CPU cores 607 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The service processing offloads 608 are specialized hardware modules purposely optimized to handle specific tasks at wire speed, such as cryptographic functions, compression/decompression, etc.

The packet buffer 609 can act as a central on-chip packet switch that delivers packets from the network interfaces 610 to packet processing elements of the data plane and vice-versa. The packet processing elements can include a slow data path implemented in software and a fast data path implemented by packet processing circuitry 606.

The packet processing circuit implementing P4 pipelines 606 can be a specialized circuit or part of a specialized circuit using one or more ASICs or FPGAs to implement a programmable packet processing pipeline such as the programmable packet processing pipeline 304 of FIG. 2. Some embodiments include special purpose hardware such as ASICs or FPGAs. The special purpose hardware can implement a P4 pipeline as a fast data path within the network appliance. The fast data path is called the fast data path because it processes packets faster than a slow data path that can also be implemented within the network appliance. An example of a slow data path is a software implemented data path wherein the CPU cores 607 and memory 604 are configured via software to implement a slow data path. A network appliance having two data paths has a fast data path and a slow data path when one of the data paths process packets faster than the other data path.

All memory transactions in the NIC 601, including host memory, on board memory, and registers may be connected via a coherent interconnect 605. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing circuit implementing P4 pipelines 606, CPU cores 607, and PCIe interface 603. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches. The NOC cache may be used to aggregate memory write transactions which may be smaller than the cache line (e.g., size of 64 bytes) of an HBM.

The NIC 601 can have a host interface and a network interface. The host interface can be configured to provide communication link(s) with a host system. The host interface can expose NIC functions to the host system. The network interface can support network connections or uplinks with a computing network that may be, for example, a local area network, a wide area network, or other network.

Memory transactions in the NIC 601, including host memory, high bandwidth memory (HBM), and registers may be connected via a coherent network on a chip (NOC) based on a prequalified IP core from a third party. The NOC may provide cache coherent interconnect between NOC masters, including P4 pipeline, DMA, PCIe, and CPU cores. All traffic targeting HBM may be stored in the NOC cache (e.g., 1 MB cache). The NOC cache may be kept coherent with the CPU core caches. The NOC cache may be used to aggregate HBM write transactions which may be smaller than the cache line (e.g., size of 64 bytes), as the HBM is not efficient when processing small writes. The NOC cache may have high bandwidth (e.g. to 3.2 Tb/s operation) as it fronts the HBM which has high bandwidth (e.g. 1.6 Tb/s HBM).

The NIC 601 can have an internal HBM memory system for running Linux, storing large data structures such as flow tables and other analytics, and providing buffering resources for advanced features including TCP termination and proxy, deep packet inspection, storage offloads, and connected FPGA functions. The memory system can have an HBM module which may support 4 GB capacity or 8 GB capacity, depending on package and HBM.

As mentioned above, the system may comprise a PCIe host interface. The PCIe host interface may support a bandwidth of, for example, 100 Gb/s per PCIe connection (e.g., dual PCIe Gen4×8 or single PCIe Gen3×16).

Figure 7:
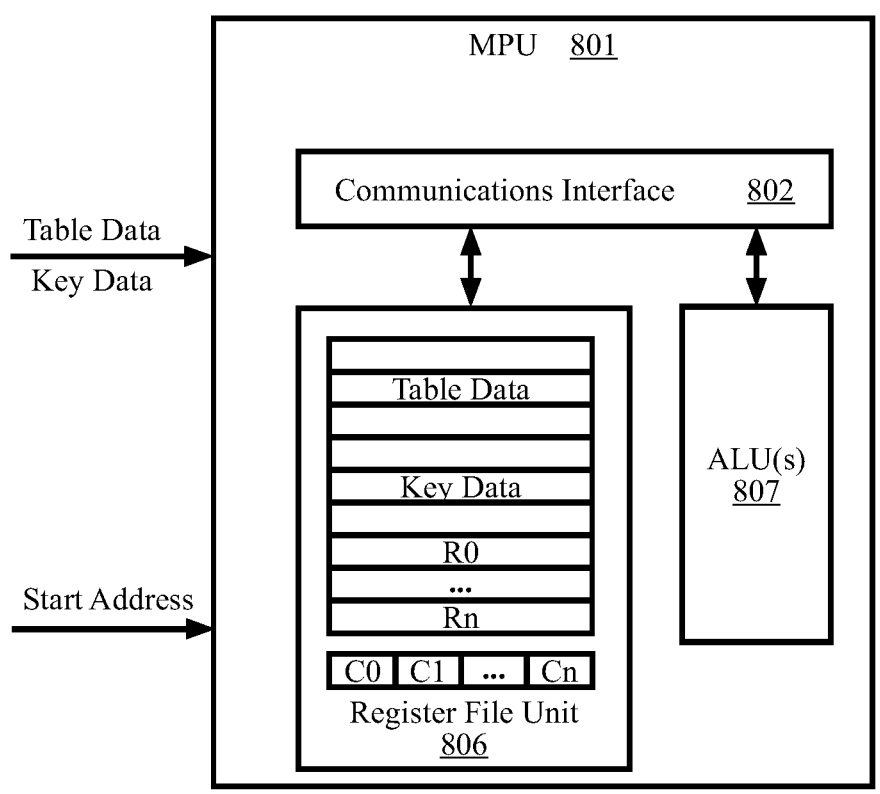
FIG. 7 illustrates a block diagram of a match processing unit (MPU) that may be used within the exemplary system of FIG. 6 to implement some aspects.

FIG. 7 illustrates a block diagram of a match processing unit (MPU) 801 that may be used within the exemplary system of FIG. 6 to implement some aspects. The MPU 801 can have multiple functional units, memories, and a register file. For example, the MPU 801 may have a register file unit 806, a communication interface 802, arithmetic logic units (ALUs) 807 and various other functional units.

In the illustrated example, the MPU 801 can have a write port or communication interface 802 allowing for memory read/write operations. For instance, the communication interface 802 may support packets written to or read from an external memory (e.g., high bandwidth memory (HBM) of a host device) or an internal static random-access memory (SRAM). The communication interface 802 may employ any suitable protocol such as Advanced Microcontroller Bus Architecture (AMBA) Advanced extensible Interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 802 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long they do not write to the same byte. In some cases, dirty bytes in the table need not be contiguous and the MPU may only write back a table if at least one bit in the dirty vector is set. Though packet data is transferred according the AXI protocol in the packet data communication on-chip interconnect system according to the present exemplary embodiment in the present specification, it can also be applied to a packet data communication on-chip interconnect system operating by other protocols supporting a lock operation, such as Advanced High-performance Bus (AHB) protocol or Advanced Peripheral Bus (APB) protocol in addition to the AXI protocol.

Programs executable by the MPU or a match action pipeline can be any programs such as P4 programs related to reading table data, building headers, DMA to/from memory regions in HBM or in the host device and various other actions. The one or more programs can be executed in any stage of a pipeline as described elsewhere herein.

The MPU 801 can have a register file unit 806 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 806 may comprise a plurality of general-purpose registers (e.g., R0, R1, Rn) which may be initially loaded with metadata values then later used to store temporary variables within execution of a program until completion of the program. For example, the register file unit 806 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some embodiments, each register of the register file is 64 bits and may be initially loaded with special metadata values such as hash value from table lookup, packet size, PHV timestamp, programmable table constant and the like.

In some embodiments, the register file unit 806 can have a comparator flags unit (e.g., C0, C1, Cn) configured to store comparator flags. The comparator flags can be set by calculation results generated by the ALU which in return can be compared with constant values in an encoded instruction to determine a conditional branch instruction. In some embodiments, the MPU can have one-bit comparator flags (e.g. 8 one-bit comparator flags). In practice, an MPU can have any number of comparator flag units each of which may have any suitable length.

The MPU 801 can have one or more functional units such as the ALU(s) 807. An ALU may support arithmetic and logical operations on the values stored in the register file unit 806. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g. table flush), or perform operations that are not related to PHV update. For example, an ALU may be configured to perform calculations on descriptor rings, scatter gather lists (SGLs), and control data structures loaded into the general purpose registers from the host memory.

The MPU 801 can have other functional units such as meters, counters, action insert units, and the like. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some case, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table addresses, for example, one for the previous table write-back and another address lock for the current MPU program.

In some embodiments, a single MPU may be configured to execute instructions of a program until completion of the program. In other embodiments, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 8:
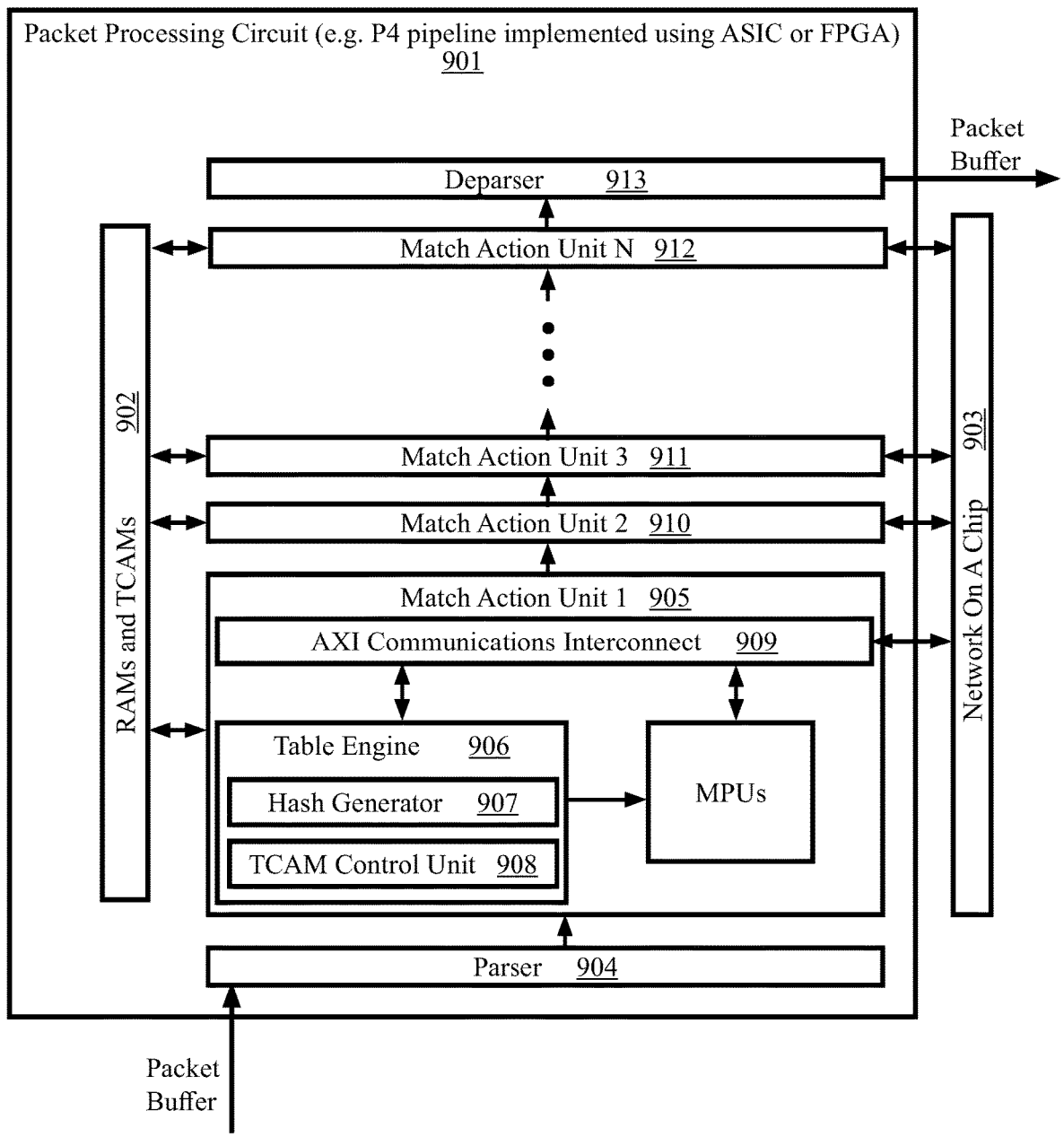
FIG. 8 illustrates a block diagram of a packet processing circuit that may be used as a P4 pipeline within the exemplary system of FIG. 6.

FIG. 8 illustrates a block diagram of a packet processing circuit 901 that may be configured as a P4 pipeline within the exemplary system of FIG. 6. A P4 pipeline can be programmed to provide various features, including, but not limited to, routing, bridging, tunneling, forwarding, network ACLs, L4 firewalls, flow based rate limiting, VLAN tag policies, membership, isolation, multicast and group control, label push/pop operations, L4 load balancing, L4 flow tables for analytics and flow specific processing, DDOS attack detection, mitigation, telemetry data gathering on any packet field or flow state and various others.

A programmer or compiler may decompose a packet processing program into a set of dependent or independent table lookup and action processing stages (i.e., match-action) that can be mapped onto the table engine and MPU stages. The match-action pipeline can have a plurality of stages. For example, a packet entering the pipeline may be first parsed by a parser (e.g., parser 904) according to the packet header stack specified by a P4 program. This parsed representation of the packet may be referred to as a packet header vector (PHV). The PHV may then be passed through stages (e.g., stages 905, 910, 911, 912) of the match-action pipeline. Each pipeline stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser 913. The deparser 913 can rewrite the original packet according to the PHV fields which may have been modified in the pipeline. A packet processed by a pipeline may be placed in a packet buffer for scheduling and possible replication. In some cases, once the packet is scheduled and leaves the packet buffer, it may be parsed again to create an egress parsed header vector. The egress parsed header vector may be passed through the pipeline after which a final deparser operation may be executed before the packet is sent to its destination interface or recirculated for additional processing. The NIC 601 of FIG.

6 can have a P4 packet processing pipeline that can be implemented via a packet processing circuit 901.

A pipeline can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV.

The PHV produced by the parser may have any size or length. For example, the PHV can be a least 512 bits, 256 bits, 128 bits, 64 bits, 32 bits, 8 bits or 4 bits. A long PHV (e.g., a 6 Kb PHV containing all relevant header fields and metadata) can be time division multiplexed (TDM) across several cycles. The TDM capability provides support for variable length PHVs, including very long PHVs to enable complex features. A PHV length may vary as the packet passes through the pipeline stages.

The pipeline MPUs of the match-action units 905, 910, 911, 912 can be same as the MPU 801 of FIG. 7. Match-action units can have one or more MPUs that may be identical.

A table engine 906 may be configured to support per-stage table match. For example, the table engine 906 may be configured to hash, lookup, and/or compare keys to table entries. The table engine 906 may be configured to control the address and size of the table, PHV fields to use as a lookup key, and MPU instruction pointer that defines the P4 program associated with a table entry. A table result produced by the table engine can be distributed to the multiple MPUs.

The table engine 906 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on packet type or protocols (e.g., Internet Protocol version 4 (1Pv4), Internet Protocol version 6 (1Pv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

The table engine 906 can have a TCAM control unit 908. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups.

The table engine 906 may be implemented by hardware or circuitry. The table engine may be hardware defined. In some cases, the results of table lookups or table results are provided to the MPU in its register file.

A match-action pipeline can have multiple match-action units such as the N units illustrated in the example of FIG. 8. The match-action units can share a common set of SRAMs and TCAMs 902. The SRAMs and TCAMs 902 may be components of the pipeline. This arrangement may allow the match-action units to divide match table resources in any suitable proportion which provides convenience to the compiler and eases the complier's task of resource mapping. Any suitable number of SRAM resources and any suitable number of TCAM resources may be used by each pipeline. For example, the illustrated pipeline can be coupled to ten SRAM resources and four or eight TCAM resources. In some instances, TCAMs may be fused vertically or horizontally for a wider or deeper search.

Figure 9:
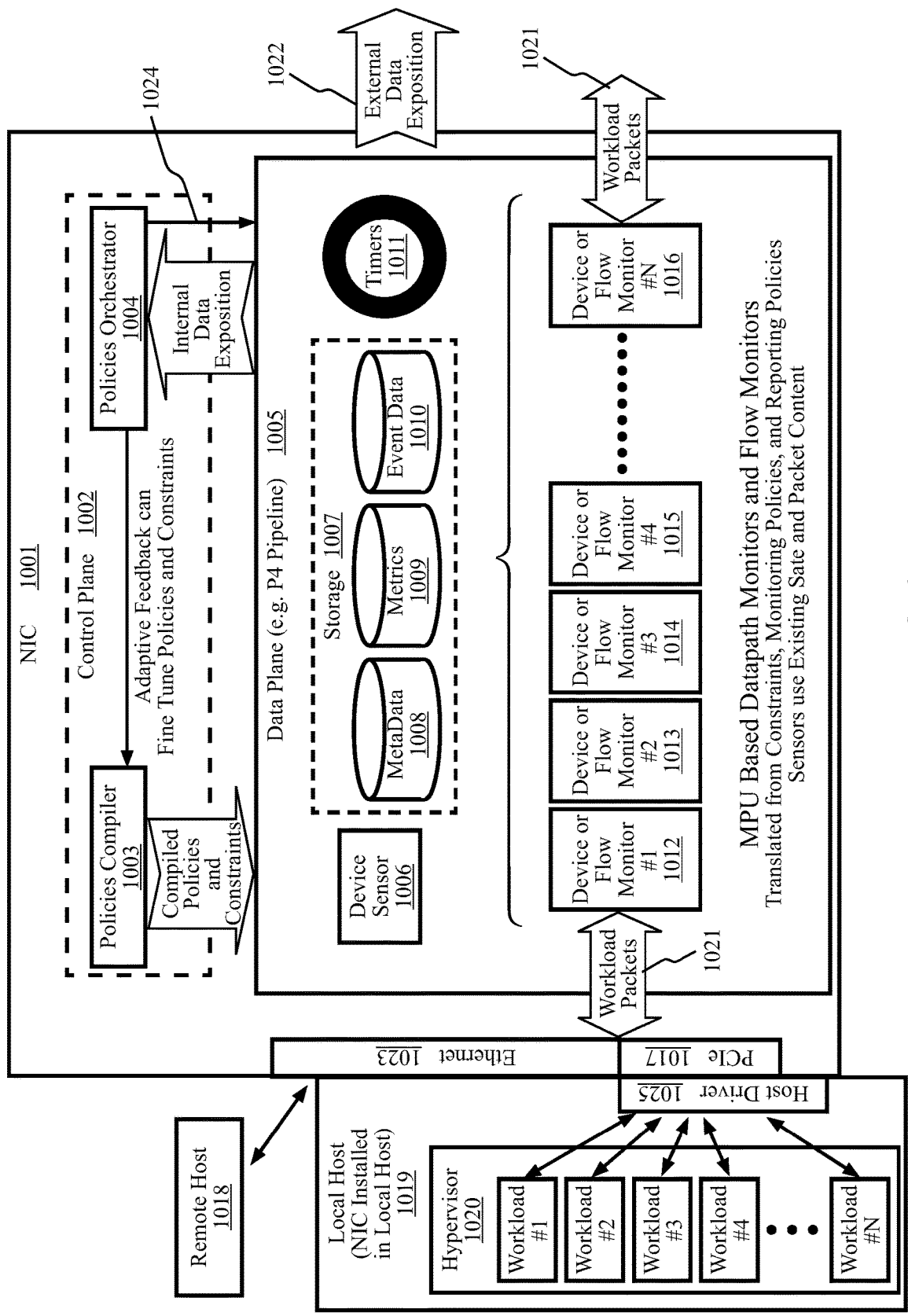
FIG. 9 illustrates a NIC (Network Interface Card) configured to implement smart sensing according to some aspects.

FIG. 9 illustrates a NIC (Network Interface Card) 1001 configured to implement smart sensing according to some aspects. The NIC 601 of FIG. 6 can be configured to implement the aspects illustrated in FIG. 9. The NIC has a control plane 1002, a data plane 1005, and can be installed in a host system 1019. The data plane 1005 can process workload packets 1021 received from remote hosts 1018 via ethernet ports 1023 and from a local host 1019 via a PCIe (Peripheral Component Interface express) interface 1017. PCIe is an interface standard designed for connecting high-speed components within a computer. Numerous virtual machines, shown as workloads 1-N, can be run by a hypervisor 1020 within the local host 1019. The virtual machines can each generate workload packets 1021 via a host driver 1025 and the PCIe interface 1017. In addition, applications (e.g. load balancers, web servers, etc.) running directly on the local host 1019 can generate workload packets 1021 via the host driver 1025 and the PCIe interface 1017.

The data plane 1005 can process the workload packets 1021. Device or flow monitors 1010, 1013, 1014, 1015, 1016 can be implemented by the MPUs in the data plane's packet processing pipeline. The data plane can include device sensors 1006 and timers 1011 that can be used for measuring or calculating metrics 1009. Device sensors can measure parameters corresponding to the NIC itself to generate one or more device metric such as buffer free space, CPU usage, queue usage, etc. Timers 1011 can be used for the timing or scheduling of measurements and for time-based measurement calculations. For example, measuring packet throughput once every 5 seconds can require timing the measurements to occur at 5 second intervals and calculating the throughput by dividing a packet counter by an elapsed time. Storage 1007 can store the metrics 1009 as well as metadata 1008 and event data 1010. Metadata can include measurements of metrics within a context. Non-limiting examples of metadata can include: bandwidth (metric) between source and destination IP addresses (context); outstanding TCP connection requests (metric) for port 80 within an IP address range (context); etc. Here, bandwidth and outstanding TCP connection requests are metrics. One context can be source and destination IP addresses. Another context can be port 80 within an IP address range. The event data 1010 can include metrics and metadata collected in relation to an event, such as detection of a suspected DDoS attack.

The control plane 1002 can include a policies orchestrator 1004 and a policies compiler 1003. In some embodiments, computer readable instructions can be executed by processor cores to thereby implement the policies orchestrator 1004 and the policies compiler 1003. The policies compiler 1003 can compile policies and constraints into instructions and data formatted for use by the data plane 1005. The policies orchestrator 1004 can ensure that the data plane 1005 is configured with monitoring policies and reporting policies. In a non-limiting example, a monitoring policy can be calculating throughput and bandwidth every 10 seconds. The policies orchestrator 1004 can provide the monitoring policy to the policies compiler 1003 in the P4 domain-specific language. The policies compiler can compile the monitoring policy. As discussed above the data plane can be configured to implement the compiled policy. The policies orchestrator 1004 can trigger 1024 the data plane to implement a policy such as to implement a monitoring policy or a reporting policy. Implementing a reporting policy results in a report or data exposition. External data exposition 1022 can include sending a report, such as a bandwidth histogram, to a recipient, or can include mirroring all or parts of certain traffic flows to a recipient.

Internal data exposition can include reporting data or an event to the policies orchestrator. The policies orchestrator 1004 can be configured to implement a new policy or change an existing policy based on the internal data exposition 1024. A nonlimiting example is that, when total bandwidth exceeds a threshold that three other monitoring policies are to be triggered such as recording TCP bandwidth, UDP bandwidth, and ICMP bandwidth every second (metric is bandwidth, the three contexts of the three measurement policies are TCP packets, UDP packets, and ICMP packets). The policies orchestrator can ensure that the data plane is configured to make the measurements, which may involve submitting compilable policies to the policies compiler 1003 and configuring the data plane with the complied policies. The policies orchestrator 1004 may also trigger 1024 the data plane to implement the measurement polices, at which time the data plane may begin making the measurements.

Having implemented TCP, UDP, and ICMP bandwidth measurements, internal data expositions may indicate that TCP and UDP bandwidth are below specified thresholds while ICMP bandwidth exceeds a specified threshold. In response, the NIC can automatically stop the TCP and UDP bandwidth measurements and can automatically implement a monitoring policy that every 10 seconds stores, for each destination address, the number of ICMP packets directed to that destination address. The policies orchestrator 1004 can ensure that the data plane is configured to implement the monitoring policy, perhaps requiring policy compilation by the policies compiler 1003. A reporting policy can result in an external data exposition of a report indicating the number of ICMP packets per destination address.

The nonlimiting example provided above illustrates certain advantages of smart sensing wherein the NIC uses adaptive feedback to automatically change, adjust, or tune the policies and constraints in response to observed network traffic flow anomalies.

Figure 10:
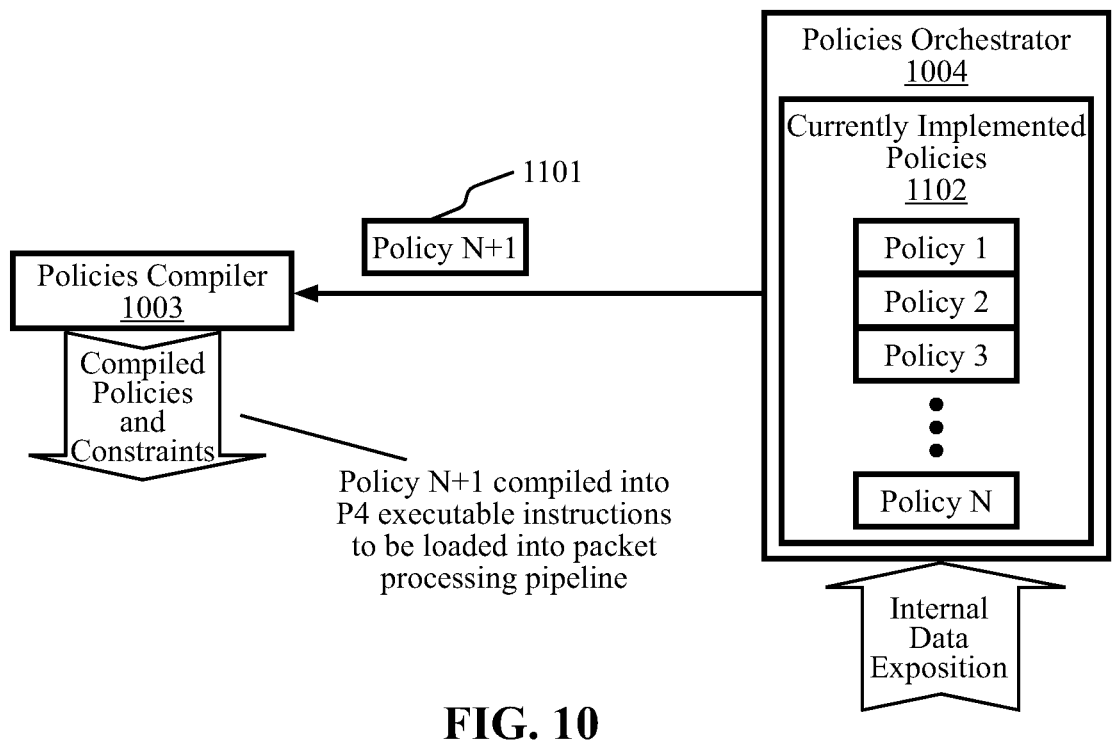
FIG. 10 illustrates a new policy being implemented according to some aspects.

FIG. 10 illustrates a new policy 1101 being implemented according to some aspects. The policy orchestrator can track the policies currently implemented by the data plane 1102. FIG. 10 indicates that policies 1 through N, inclusive, are currently implemented. Policy N+1 1101 is a new policy that is to be implemented by the data plane. The new policy 1101 can be submitted the policies compiler 1003. The policies compiler 1003 can compile the new policy. The compiled policy can be, for example, a set of P4 executable instructions that, when executed by a P4 pipeline, implement the new policy 1101. The compiled policy can be installed in the packet processing pipeline.

Figure 11:
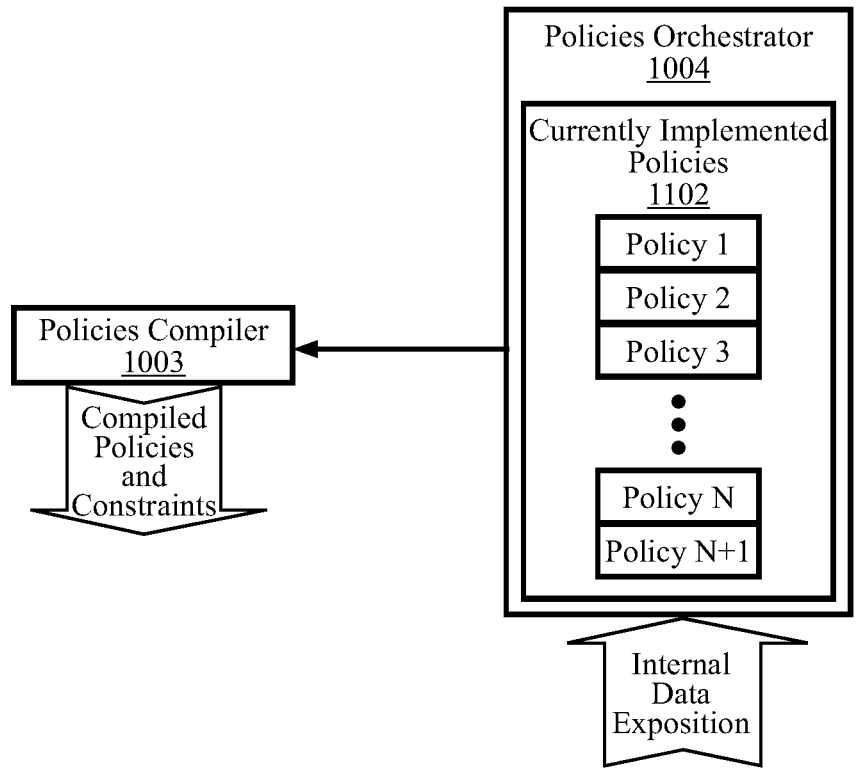
FIG. 11 illustrates the policy orchestrator after the new policy of FIG. 10 is implemented according to some aspects.

FIG. 11 illustrates the policy orchestrator after the new policy of FIG. 10 is implemented according to some aspects. As can be seen, policy N+1 is now shown among the group of currently implemented policies.

Figure 12:
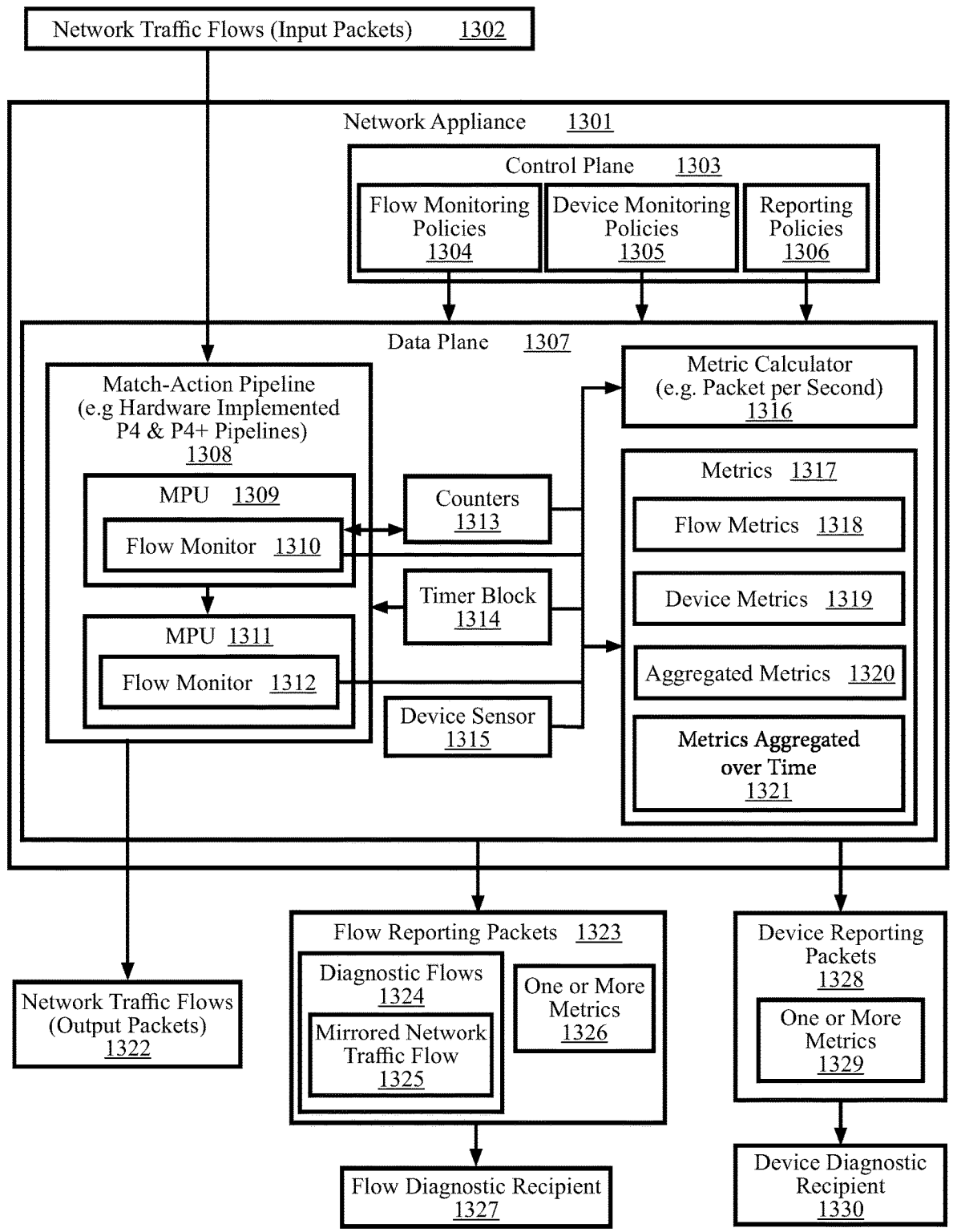
FIG. 12 illustrates smart sensors implemented in a network appliance according to some aspects.

FIG. 12 illustrates smart sensors implemented in a network appliance according to some aspects. The aspects of FIG. 12 can be implemented by the NIC 601 of FIG. 6 and the NIC 1001 of FIG. 9. The network appliance 1301 has a match-action pipeline 1308 that receives input packets of network traffic flows 1302 and produces output packets of the network traffic flows 1322. The match-action pipeline 1308 can include hardware implemented P4 and P4+ pipelines as discussed above. A first MPU 1309 of the match action pipeline 1308 can be configured to implement a first traffic flow monitor 1310. A second MPU 1311 of the match action pipeline 1308 can be configured to implement a second traffic flow monitor 1312. The data plane can include counters 1313 that can count aggregate numbers of packets, packets with certain contexts, etc. The timer block 1314 can include timers such as timers 1011 and can produce a time value such as a timestamp or an elapsed time. The device sensor 1315 can measure CPU usage, CPU temperature, fan speed, buffer utilization, and other metrics related directly to network appliance performance and diagnostics. A metric calculator 1316 can receive lower levels metrics (e.g. packet counts from the counters, times or elapsed time from the timers, etc.) and can calculate other metrics such as bandwidth and throughput. Note: a calculation can use a monitoring policy's specified sampling interval instead of an elapsed time measurement. The network appliance can store metrics 1317 such as flow metrics 1318, device metrics 1319, aggregated metrics 1320, and metrics aggregated over time 1321. Flow metrics 1318 relate to the packets of the network traffic flows 1302, 1322 processed by the network appliance. Device metrics 1319 relate to the status of the network appliance 1301 itself. Flow metrics and device metrics can have a context such as a count of packets having a certain 5-tuple. A parameter, such as a device metric or flow metric, or many parameters/metrics can be aggregated into an aggregation. Aggregated metrics can relate to metrics that are gathered together. As such, aggregated metrics can be viewed as aggregations of parameters, the parameters being metrics, metadata, etc. Aggregated metrics can have a context. Non-limiting examples of contexts include: source address; destination address; source/destination pairs; services, protocol, and 5-tuple. An address may be specified as an address range. For example, an IPv4 subnet can be specified as an address and a subnet mask (i.e. 192.168.0.0/255.255.0.0 for all host on the 192.168.x.x subnet). A service may be determined by the destination port (e.g. HTTP at TCP port 80, HTTPS at TCP at port 8080, NVMe/iWARP at TCP port 4420 and UDP port 4420). Note: iWARP is not an acronym, it relates to RDMA (remote direct memory access) as is used by RoCE. The service may also be determined by inspecting the layer 7 packet in a layer 4 payload, which is sometimes called deep packet inspection.

Aggregated metrics 1320 can include collections of data within a context such as packet count, packet loss, bandwidth, and outstanding TCP connection requests for a destination address. Metrics aggregated over time 1321 can include flow metrics 1318, device metrics 1319, aggregated metrics 1320, and other parameters that are aggregated over time by being stored periodically, added to a histogram bucket, in association with a timestamp, etc. Metrics aggregated over time 1321 can be used for producing histograms for inclusion in external data expositions. The metrics 1317 are illustrated as stored in the data plane. Certain of the metrics can be stored elsewhere such as in the HBM of NIC 601 of FIG. 6.

The network appliance can send flow reporting packets 1323 to a flow diagnostic recipient 1327. The flow reporting packets can include one or metrics 1326 or diagnostic flows 1324. One example of a diagnostic flow is a mirrored traffic flow 1325 similar to an ERSPAN flow mirror. The flow reporting packets 1323 can include packets within a narrow context such as DNS requests to a specific destination address. The network appliance can send device reporting packets 1328 including one or more metrics 1329 to a device diagnostic recipient 1330. A reporting policy can specify a recipient. The flow diagnostic recipient 1327 or device diagnostic recipient 1330 can be specified via IP address, port, and protocol (e.g. FTP to a port at a destination). The flow diagnostic recipient 1327 or device diagnostic recipient 1330 can be specified via a service such as an email address for the recipient. The diagnostics can be sent as raw data or formatted data. For example, a reporting policy can specify the formatting of the data (e.g. histogram as JSON data pairs, etc.) in a report and the device reporting packets 1323, 1328 can carry the report. A reporting packet or traffic flow can contain any one of, a collection of, or all of the device metrics, flow metrics, and mirrored flows such as ERSPAN flows.

Figure 13A:
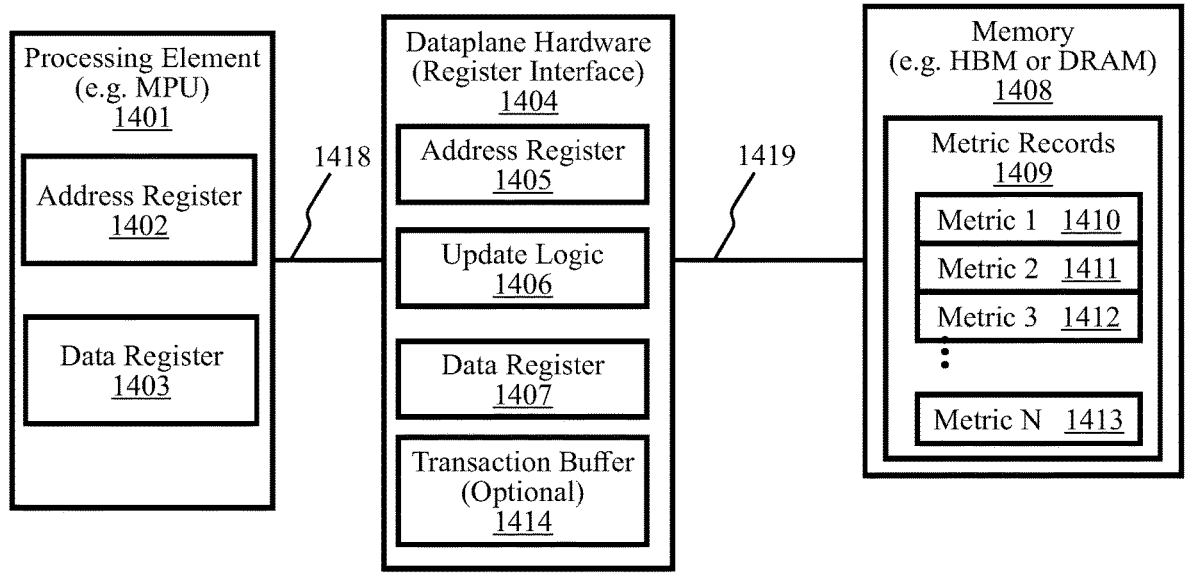
FIGS. 13A-13B illustrate a data plane register interface configured to provide write operations that may be executed without halting an MPU according to some aspects.
Figure 13B:
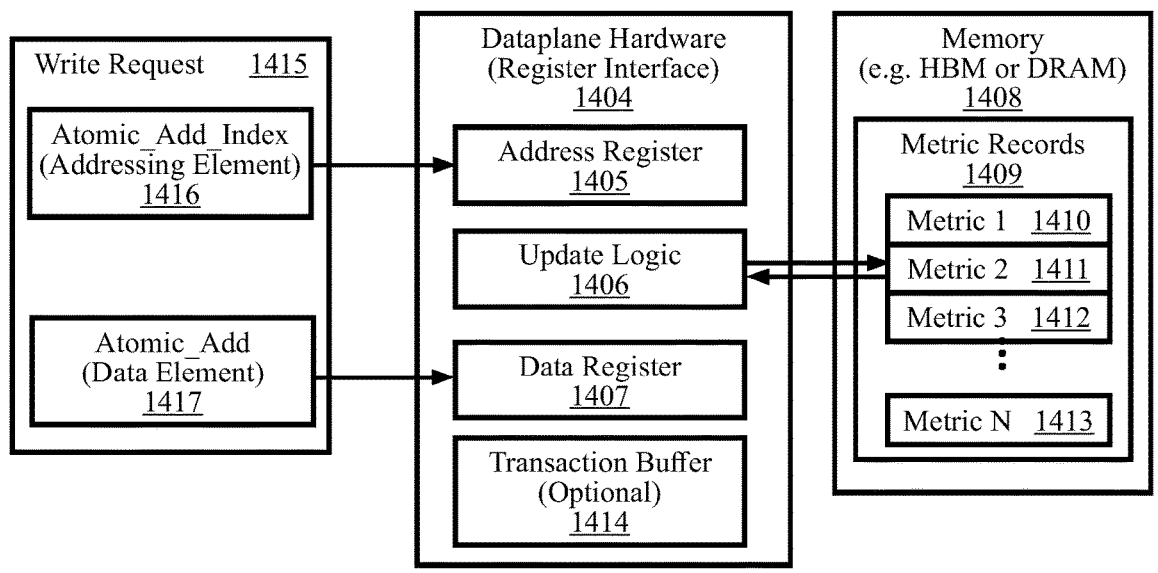

FIGS. 13A-13B illustrate a data plane register interface 1404 configured to provide write operations that may be executed without halting an MPU 1401 according to some aspects. The register interface 1404 can provide for updating counters and metrics that are stored in memory without halting or delaying an MPU. Halting an MPU 1401 while reading data from a memory 1408 or writing data to a memory can interfere with processing packets at line speed. A pipeline's MPUs can be configured to implement flow monitors, which may need to increment counters or store calculated values. For example, a packet 5-tuple may match a monitored flow for which at least one counter is to be incremented (e.g. a packet counter counting packets within the context of the 5-tuple). Updating the counter may incur wait states, particularly if the counter is not located within the pipeline's memory (e.g. RAM 902, RAM 1011, RAM 1111).

A processing element 1401, such as an MPU, can update metric records 1409 stored in memory 1408 via a register interface 1404. The processing element 1401 can include an address register 1402 and a data register 1403. The address register 1402 can indicate a location of a metric record and the data register 1403 can indicate a value by which the metric stored in the metric record is to be incremented, decremented, etc. The register interface can include an address register 1405, update logic 1406, a data register 1407, and a transaction buffer 1414. The memory, which can be DRAM or HBM such as that of NIC 601 of FIG. 6, can store metrics in metric records 1409 such as metric record 1 1410, metric record 2 1411, metric record 3 1412, and metric record N 1413.

In an embodiment, elements of the network appliance are integrated onto the same IC device, e.g., such as a "system-on-chip" or "SoC." In other embodiments, some elements of the network appliance are connected to each other on a printed circuit board (PCB). In an embodiment, the processing element 1401 may be a CPU (e.g., CPU cores 607, FIG. 6) or a data plane processing element (e.g., packet processing circuit 606 of FIG. 6), or some other processing element, as is known in the field. Although not shown in FIG. 13A or 13B, a processing element may include a memory interface, an ALU, a register bank, an instruction fetch unit, and an instruction decoder, which are configured to execute instructions. The processing element may also include internal registers that can only be used by the processing element (e.g., instruction registers, memory address registers, and memory buffer registers) and user-accessible registers such as address registers and data registers that can be used by external components and/or software as is known in the field. Although only a single processing element is shown in FIGS. 13A and 13B, the network appliance will typically include more than one processing element that has access to the register interface 1404 and to the memory 1408.

The register interface 1404 can be configured to implement operations related to metrics management as is described below. The register interface includes an address register 1405, a data register 1407, and update logic 1406. In an embodiment, the register interface is integrated onto the same IC device as the processing element 1401 and the address register 1405 and data register 1407 are used to hold components of write requests. For example, with regard to the write requests, the address register 1405 holds an index (e.g., atomic_add_index) that is used to identify a metric record storing a metric in the memory and the data register 1407 holds a data element (e.g., data_element) that is used to update the identified metric that is stored in the memory 1408. In an embodiment, the address and data registers, 1405 and 1407, are 64-bit hardware registers that are implemented in hardware circuits such as flip-flop circuits as is known in the field. Although the address and data registers are described as 64-bit registers, the address and data registers could be of a different size, such as, for example, 32-bit registers. In an embodiment, the address and data registers of the register interface are embodied as a small amount of fast storage that is external to the processing element 1401 and that is distinct from the processing element address and data registers 1402 and 1403, which are incorporated into the processing element 1401, e.g., as part of an intellectual property (IP) block that is often provided by third-party CPU or MPU providers. Although not shown in FIGS. 13A and 13B, the register interface may include a first set of address and data registers for receiving write requests from the processing element and a second set of address and data registers for returning information related to write requests (e.g., a write response). For example, a write response may involve a simple "write done" or "write error" indicator. The register interface may include additional registers (e.g., a transaction buffer 1414) to buffer multiple write requests. The register interface may also have access to clock information such as a system clock of the network appliance, timers 1011, or timer block 1314. The clock information may be used to generate timestamps, which may be used for time-related metrics.

In an embodiment, the address and data registers 1405 and 1407 of the register interface 1404 are connected to the corresponding address and data registers, 1402 and 1403, within the processing element 1401 via a bus 1418 (e.g., the coherent interconnect 605 as described above with reference to FIG. 6). In an embodiment, the coherent interconnect that interconnects the processing element 1401 and the register interface 1404 includes circuits that steer write requests from the processing element to the register interface based on an address in the write requests.

In an embodiment, the update logic 1406 of the register interface 1404 is implemented in hardware circuits that interact with the address register 1405 and the data register 1407 and with data from an array of metrics 1409 that is stored in the memory 1408 to service write requests received from the processing element 1401. For example, the update logic 1406 can include hardware circuits configured to implement finite state machines (FSMs) that perform metric update operations that include reading metrics from the memory, updating metrics to generate updated metrics, and then writing the updated metrics back to the memory. In an embodiment, the update logic is implemented as a pipeline machine, which includes a stage for decoding write requests, a stage for reading metrics from the array of metrics that are stored in the memory, a stage for updating metrics (e.g., executing add operations), and a stage for writing updated metrics back to the array of metrics that are stored in the memory. Operations of the register interface are described in more detail below with reference to FIG. 13B.

Turning now to the memory 1408, the memory can be general purpose memory such as RAM. For example, the memory can be double-data rate synchronous dynamic RAM (DDR-SDRAM or simply DDR), although the RAM may be static RAM (SRAM), dynamic RAM (DRAM), synchronous DRAM (SDRAM), or a combination thereof. As illustrated in FIGS. 13A and 13B, the memory stores the array of metrics 1409. The array of metrics includes individual metric records 1410, 1411, 1412, 1413. In general, a metric record stores a data element that corresponds to a metric that is maintained in the memory. For example, data elements may include data that is used to maintain a metric such as packet count, total bytes count, event count, histograms such as packet distribution, and timestamps such as packet arrival time and request latency. In an embodiment, the metric records are 64-bits (8-bytes) each and are 8-byte address aligned.

FIG. 13B illustrates operations associated with a write request that occurs in a data plane and the memory of a network appliance. For example, the operations performed by the register interface 1404 in response to a write request from a processing element include receiving a write request for a metric update, where the write request includes an index (e.g., atomic_add_index) for use in generating the physical memory address of the metric record in the array of metric records 1409, and then reading the metric from the array according to the generated physical memory address. A write request 1415 can be received at the address register 1405 of the register interface and at the data register 1407 of the register interface. The data received at the address register is a first binary value that includes a base address and an index (e.g., atomic_base_address+atomic_add_index), in which the index corresponds to a particular metric record. The data received at the data register is a second binary value that includes a data element (e.g., data_element) that is used to update the metric. The index in the address register is used by the register interface to read the corresponding metric record in the array of metric records 1409. For example, the register interface can use the index to generate a physical memory address of the metric record in the memory. After the physical memory address of the metric record 1411 in the memory is determined, the metric is read from the array of metric records, and an update operation is executed by the update logic. For example, the update logic executes an add operation in which the value of the data element (e.g., data_element) in the data register is added to the value of the data element that was read from the metric record 1411. For example, the add operation involves adding a packet to an existing packet count, adding bytes to an existing total bytes count, adding an event to an event count, adding a value to a bucket of a histogram, updating a timestamp, or updating a request latency. Once an updated metric is generated from the update operation, the updated metric can be written back to the metric record in the memory. In an embodiment, once the write to the memory is complete, the register interface may acknowledge to the processing element that the write was completed (e.g., write_response). In an embodiment, the write may be acknowledged to the processing element as soon as the write request arrives at the register interface and in another embodiment, the write may be acknowledged to the processing element after the update operation is complete.

Figure 14:
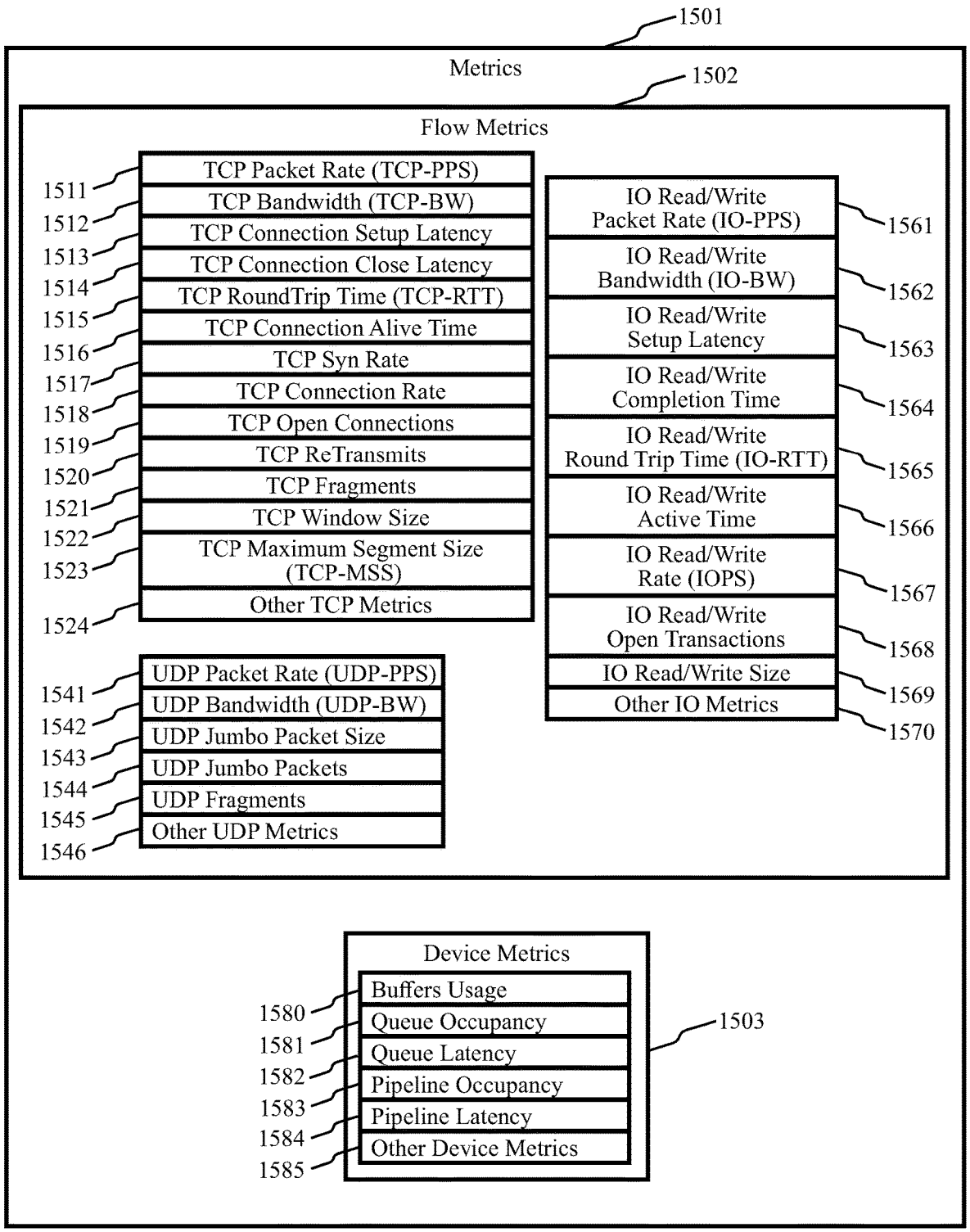
FIG. 14 is a high-level diagram illustrating a non-limiting example of metrics collectable by a data plane according to some aspects.

FIG. 14 is a high-level diagram illustrating a non-limiting example of metrics 1501 collectable by a data plane according to some aspects. The metrics 1501 include flow metrics 1502 and device metrics 1503. The flow metrics 1502 include TCP metrics, UDP metrics, and storage metrics. The metrics 1501 can be stored and updated in memory as described above with respect to FIGS. 13A and 13B.

The TCP metrics include: TCP Packet Rate (TCP-PPS) 1511; TCP Bandwidth (TCP-BW) 1512; TCP Connection Setup Latency 1513; TCP Connection Close Latency 1514; TCP Round Trip Time (TCP-RTT) 1515; TCP Connection Alive Time 1516; TCP Syn Rate 1517; TCP Connection Rate 1518; TCP Open Connections 1519; TCP Retransmits 1520; TCP Fragments 1521; TCP Window Size 1522; TCP Maximum Segment Size (TCP-MSS) 1523; and other TCP Metrics 1524.

The UDP metrics include: UDP Packet Rate (UDP-PPS) 1541; UDP Bandwidth (UDP-BW) 1542; UDP Jumbo Packet Size 1543; UDP Jumbo Packets 1544; UDP Fragments 1545; and other UDP Metrics 1546.

The storage metrics, can be associated with NVMe/TCP and RoCE traffic and include: IO Read/Write Packet Rate (IO-PPS) 1561; IO Read/Write Bandwidth (IO-BW) 1562; IO Read/Write Setup Latency 1563; IO Read/Write Completion Time 1564; IO Read/Write Round Trip Time (IO-RTT) 1565; IO Read/Write Active Time 1566; IO Read/Write Rate (IOPS) 1567; IO Read/Write Open Transactions 1568; IO Read/Write Size 1569; and other IO Metrics 1570.

The device metrics 1503 include: Buffers Usage 1580; Queue Occupancy 1581; Queue Latency 1582; Pipeline Occupancy 1583; Pipeline Latency 1584; and other Device Metrics 1585.

Those familiar with network traffic monitoring are familiar with the exemplary metrics shown in FIG. 14. The network appliances 600, 1001, 1301 of FIGS. 6, 9, and 12 can be configured to generate the metrics of FIG. 14.

FIG. 15 is a high-level diagram illustrating a non-limiting example of flow monitoring policies 1601 that can be implemented by a data plane according to some aspects. The network appliances 600, 1001, 1301 of FIGS. 6, 9, and 12 can be configured to implement the monitoring policies of FIG. 15. When implemented, the first eight monitoring policies determine specific metrics every 10 seconds. Monitoring Policy 1 1602 is to calculate TCP-BW every 10 seconds 1603. Monitoring Policy 2 1604 is to calculate TCP-BW every 10 seconds 1605. Monitoring Policy 3 1606 is to calculate TCP-RTT every 10 seconds 1607. Monitoring Policy 4 1608 is to calculate TCP-Open-Connections every 10 seconds 1609. Monitoring Policy 5 1610 is to calculate TCP-Connection-Rate every 10 seconds 1611. Monitoring Policy 6 1612 is to calculate TCP-SYN Rate every 10 seconds 1613. Monitoring Policy 7 1614 is to calculate TCP-Connection-Setup-Latency every 10 seconds 1615. Monitoring Policy 8 1616 is to calculate TCP-Connection-Close-Latency every 10 seconds 1617.

The second eight monitoring policies are substantially similar to the first eight monitoring policies excepting for the time interval being 1 second instead of 10 seconds. The second eight monitoring policies can be implemented when the network appliance detects, via the triggering of a constraint, a need to focus on a specific metric. Monitoring Policy 9 1618 is to calculate TCP-BW every 1 second 1619. Monitoring Policy 10 1620 is to calculate TCP-BW every 1 second 1621. Monitoring Policy 11 1622 is to calculate TCP-RTT every 1 second 1623. Monitoring Policy 12 1624 is to calculate TCP-Open-Connections every 1 second 1625. Monitoring Policy 13 1626 is to calculate TCP-Connection-Rate every 1 second 1627. Monitoring Policy 14 1628 is to calculate TCP-SYN Rate every 1 second 1629. Monitoring Policy 15 1630 is to calculate TCP-Connection-Setup-Latency every 1 second 1631. Monitoring Policy 16 1632 is to calculate TCP-Connection-Close-Latency every 1 second 1633.

For brevity, the first sixteen monitoring policies are shown without a context. Monitoring policy 17 1634 is to calculate TCP-BW between IP_Addr1 and IP_Addr2 port N every 1 second 1635. Here, a context is given. The TCP bandwidth between two IP addresses that is to be measured every second. Monitoring policy 18 1636 is a non-limiting example of a general form of a monitoring policy: {Operation} {Metric} {Context} at (Rate). "Operation" can be to calculate, to read, or to perform some other operation. For example, bandwidth is calculated whereas other metrics such as CPU temperature are typically read from a status register. "Metric" can be any of the metrics illustrated in FIG. 14 or other metrics familiar to those practiced in the arts of network traffic monitoring or device monitoring. "Context" can indicate the packets for which the metric is to be calculated. "Rate" can indicate the time interval between calculating or reading the metric.

FIG. 16 is a high-level diagram illustrating a non-limiting example of reporting policies that can be implemented by a data plane according to some aspects. The reporting policies, when implemented, expose data to a recipient. For internal data exposition, the flow diagnostic recipient and the device diagnostic recipient are the network appliance itself. For external data exposition, the recipient can be any entity that can be addressed electronically by the network appliance. Addresses can take the form of IP addresses, email addresses, twitter handles, etc. When implemented, Report Policy 1 (Throughput Visibility) 1702 sends a TCP-BW Histogram and a TCP-PPS histogram to destination IP address 1, port N. When implemented, Report Policy 2 (Latency Visibility) 1704 sends the TCP-RTT value, the TCP-Connection-Setup-Latency value, the TCP-Connection-Close-Latency value, and the Triggered Constrain to URL1. The values being sent are the current values of the metrics. The triggered constraint is the constraint, discussed below, that was triggered such that Report Policy 2 1704 was implemented. Implementing a policy means that the network appliance performs the processing required for performing the task indicated by the policy. Those familiar with online services are familiar with uniform resource locators (URLs) such as URL1. When implemented, Report Policy 3 (Slow Rate Attack Visibility) 1706 sends a TCP-Open-Connections histogram and a TCP-Connection-Rate histogram to Service1 at Destination IPaddr1. A host machine at an IP address such as IPaddr1 can provide services (e.g. ftp server, tftp server, web server, network appliance diagnostic endpoint, webhook, etc.) such as Service1. When implemented Report Policy 4 (High Rate Attack Visibility) 1708 sends a TCP-SYN Rate histogram, and a TCP-Connection-Rate histogram to Service1 at Destination IPaddr2. A host machine at an IP address such as IPaddr2 can provide services such as Service1. When implemented, Report Policy 5 (Mirror Traffic Flow) sends a Specified Traffic Flow to Port1 at Destination IPaddr2. Internet hosts often provide services at ports such as Port1. A specified traffic flow can be a traffic flow having a specified context such as a specified layer 3 protocol, layer 4 protocol, 5-tuple, and layer 7 protocol. Report Policy 6 (Generic Example) 1710 is included to illustrate a generic form of a report policy: send {DefinedReport or Metric} to {Recipient_Address}. A defined report can be raw data values, data values in a defined format, a mirrored traffic flow such as an ERSPAN flow, etc. For example, a histogram can be a sequence of data values paired with time stamps. Alternatively, a histogram can be an HTML file that, when loaded into a web browser, displays a formatted graph. Those familiar with automatic report generation are familiar with various methods for defining a report. The recipient address can be any address (IP address, URL, email address, twitter handle, etc.) at which an entity can receive a report.

FIG. 17 is a high-level diagram illustrating a non-limiting example of a constraint-action table that can be implemented by a data plane according to some aspects. The constraint-action pairs indicate a constraint 1802 that, when triggered, causes one or more policies 1803 to be implemented. The policies can be monitoring policies, reporting policies, or both. Each of the policies indicated in FIG. 17 are detailed in FIG. 15 or in FIG. 16. Constraint-action pairs are sometimes referred to as intents wherein there is an intent to implement a policy when an event occurs. The event being the meeting of a constraint.

The illustrated intents or constraint-action pairs are as follows. A first constraint 1804 is triggered when TCP-BW>50 Mbps OR TCP-PPS>100. The network appliance implements Report Policy 1, detailed in FIG. 16, when the first constraint 1804 is triggered. A second constraint 1806 is triggered when TCP-RTT>10 milliseconds. The network appliance implements Report Policy 2, detailed in FIG. 16, when the second constraint 1806 is triggered. A third constraint 1808 is triggered when TCP-Open-Connections>100K AND TCP-Connection-Rate<100/sec. The network appliance implements Report Policy 3, detailed in FIG. 16, when the third constraint 1808 is triggered. A fourth constraint 1810 is triggered when TCP-SYN Rate>10K AND TCP-Connection-Rate<100/sec. The network appliance implements Report Policy 4, detailed in FIG. 16, when the fourth constraint 1810 is triggered. A fifth constraint 1812 is triggered when TCP-Connection-Setup-Latency>5 milliseconds OR TCP-Connection-Close-Latency>5 milliseconds. The network appliance implements Report Policy 2, detailed in FIG. 16, when the fifth constraint 1812 is triggered. A sixth constraint 1814 is triggered when TCP-BW>50 Mbps OR TCP-PPS>100. The network appliance implements Monitoring Policy 9 and Monitoring Policy 10, detailed in FIG. 15, when the sixth constraint 1814 is triggered. A seventh constraint 1816 is triggered when TCP-BW<30 Mbps AND TCP-PPS<50. The network appliance implements Monitoring Policy 1 and Monitoring Policy 2, detailed in FIG. 15, when the seventh constraint 1816 is triggered. An eighth constraint 1818 is triggered when TCP-Open-Connections>100K AND TCP-Connection-Rate<100/sec. The network appliance implements Monitoring Policy 12 and Monitoring Policy 13, detailed in FIG. 15, when the eighth constraint 1818 is triggered. A ninth constraint 1820 is triggered when TCP-Open-Connections<30K OR TCP-Connection-Rate>300/sec. The network appliance implements Monitoring Policy 4 and Monitoring Policy 5, detailed in FIG. 15, when the ninth constraint 1820 is triggered. A tenth constraint 1822 is triggered when TCP-SYN Rate>10K AND TCP-Connection-Rate<100/sec. The network appliance implements Monitoring Policy 14 and Monitoring Policy 13, detailed in FIG. 15, when the tenth constraint 1822 is triggered. An eleventh constraint 1824 is triggered when TCP-SYN Rate<7K AND TCP-Connection-Rate>300/sec. The network appliance implements Monitoring Policy 6 and Monitoring Policy 5, detailed in FIG. 15, when the eleventh constraint 1824 is triggered. A twelfth constraint 1826 is triggered when TCP-Connection-Setup-Latency>5 milliseconds OR TCP-Connection-Close-Latency>5 milliseconds. The network appliance implements Monitoring Policy 14 and Monitoring Policy 13, detailed in FIG. 15, when the twelfth constraint 1826 is triggered. A thirteenth constraint 1828 is triggered when TCP-Connection-Setup-Latency<3 milliseconds AND TCP-Connection-Close-Latency<3 milliseconds. The network appliance implements Monitoring Policy 14 and Monitoring Policy 13, detailed in FIG. 15, when the thirteenth constraint 1828 is triggered.

The fourteenth constraint 1830 and its associated policies are provided in a generic format. The fourteenth constraint 1830 is triggered when {Metric} in {Context} {comparison} {value} is true. Metrics and contexts are discussed above. The comparison can be equal, less than, less than or equal to, greater than, greater than or equal to, or some other comparison operator. The "value" can be a number, string, or other data to which the metric can be compared. The network appliance implements {Policy} in {Context} when the fourteenth constraint 1830 is triggered. The {Context} of the constraint 1830 may be different from the {Context} for the policy 1831. Policies and contexts are discussed above.

The first five constraints, when triggered result in data exposition because report policies are implemented. The sixth and the seventh constraint-policy pairs 1814, 1816 provide for automatic adaptation of the TCP-BW and TCP-PPS monitoring as the metrics exceed one or more threshold or fall below other thresholds. The eighth constraint is similarly paired with the ninth, the tenth with the eleventh, and the twelfth with the thirteenth. Regarding the sixth and seventh constraint-policy pairs 1814, 1816, monitoring policy 1 and monitoring policy 2 can be examples of an initial flow monitoring policy that is implemented by the network appliance. An initial criterion such as "TCP-BW>50 Mbps OR TCP-PPS>100" can be an initial criterion that, when met, triggers other flow monitoring policies such as monitoring policy 9 and monitoring policy 10. Triggering a monitoring policy results in the monitoring policy being implemented by the network appliance.

In response to a trigger or an event such as meeting a criterion, the network appliance can implement a flow monitoring policy and a device monitoring policy. For example, in response to a first criterion being met, the network appliance can trigger a flow reporting policy such that a flow reporting policy is implemented to thereby generate a report and send it to a recipient via at least one flow reporting packet in accordance with the flow reporting policy. In another example, in response to a second criterion being met, the network appliance can trigger a second reporting policy, such as a device reporting policy, such that the device reporting policy is implemented to thereby generate a report and send it to a recipient via at least one device reporting packet in accordance with the flow reporting policy.

Figure 18:
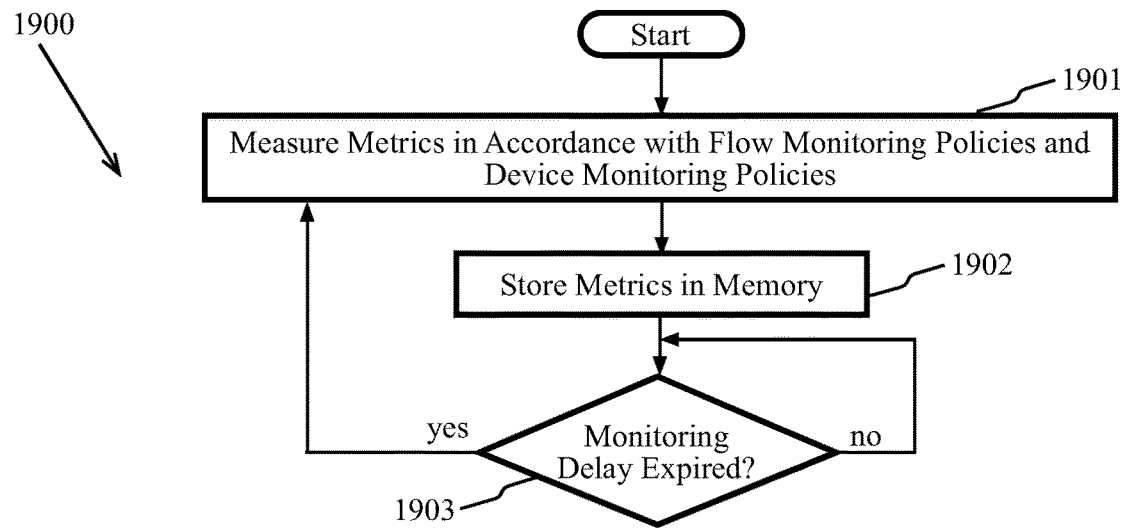
FIG. 18 is a high-level flow diagram of a monitoring process for measuring metrics according to some aspects.
Figure 19:
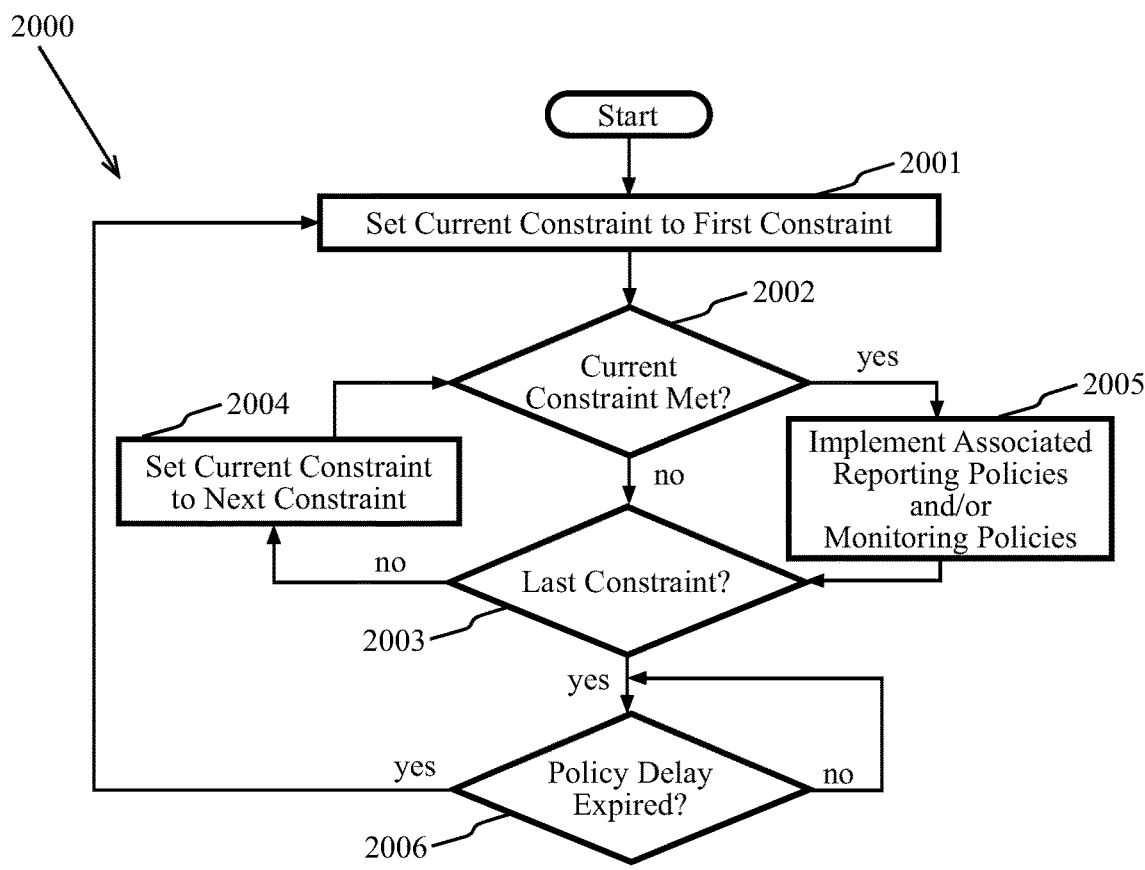
FIG. 19 is a high-level flow diagram of an event detection process for processing a constraint-action table according to some aspects.

FIGS. 18 and 19 illustrate two processes that a network appliance can run concurrently. FIG. 18 illustrates a monitoring process 1900 and FIG. 19 illustrates an event detection process 2000. The monitoring process 1900 can update and store metrics that the event detection process 2000 uses to determine if an event has occurred. An event occurs when a constraint in a constraint-action table is met.

FIG. 18 is a high-level flow diagram of a monitoring process 1900 for measuring metrics according to some aspects. A flow monitor or a device monitor can use the monitoring process 1900 to periodically measure and store metrics in accordance with the monitoring policies. At block 1901, metrics are measured in accordance with the flow monitoring policies and the device monitoring policies currently implemented by the network appliance. At block 1902, the metrics are stored in memory. At block 1903, the network appliance can delay the process a set amount of time, based on the timings of the implemented monitoring policies, before looping back to block 1901.

FIG. 19 is a high-level flow diagram of an event detection process 2000 for processing a constraint-action table according to some aspects. A network appliance can use the event detection process 2000 to periodically process the constraint-action table and trigger monitoring policies or reporting policies. At block 2001, the first constraint is set as the current constraint. If the current constraint is met at block 2002, then the reporting and/or monitoring policies associated with the constraint are implemented at block 2005 before the process proceeds to block 2003. Otherwise, the process proceeds directly to block 2003. If the current constraint is not the last constraint at block 2003 then the current constraint is set to the next constraint before the process loops back to block 2002. If, at block 2003, the current constraint is the last constraint, the network appliance can delay the process a set amount of time at block 2006, based on the timings of implemented policies, before looping back to block 2001.

Figure 20:
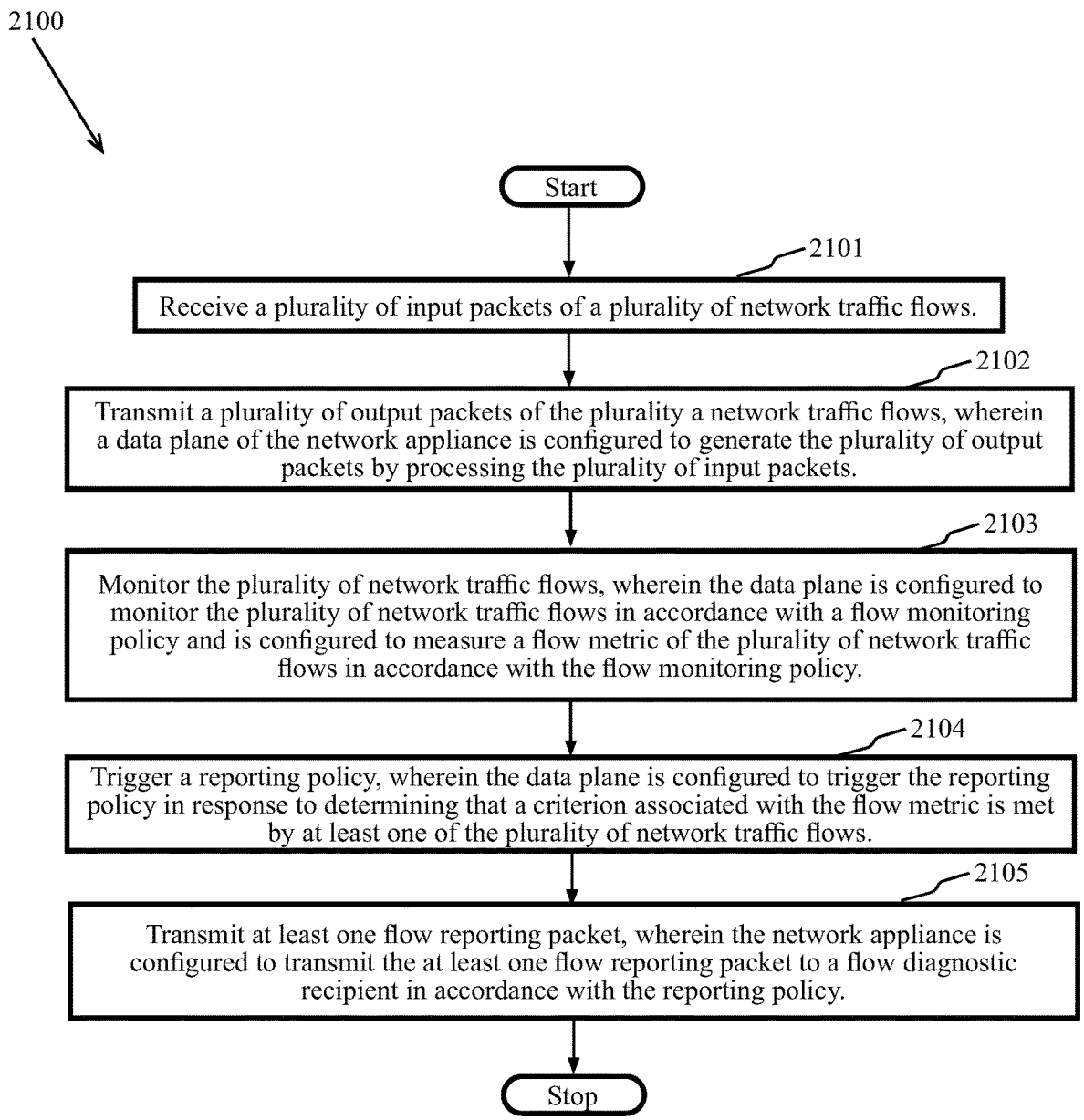
FIG. 20 illustrates a high-level diagram of a method implemented by a network appliance with a data plane configured for smart sensing according to some aspects.

FIG. 20 illustrates a high-level diagram of a method 2100 implemented by a network appliance with a data plane configured for smart sensing according to some aspects. At block 2101, the network appliance can receive a plurality of input packets of a plurality of network traffic flows. At block 2102, the network appliance can transmit a plurality of output packets of the plurality a network traffic flows, wherein a data plane of the network appliance is configured to generate the plurality of output packets by processing the plurality of input packets. At block 2103 the network appliance can monitor the plurality of network traffic flows, wherein the data plane is configured to monitor the plurality of network traffic flows in accordance with a flow monitoring policy and is configured to measure a flow metric of the plurality of network traffic flows in accordance with the flow monitoring policy. At block 2102, the network appliance can trigger a reporting policy, wherein the data plane is configured to trigger the reporting policy in response to determining that a criterion associated with the flow metric is met by at least one of the plurality of network traffic flows. At block 2102, the network appliance can transmit at least one flow reporting packet, wherein the network appliance is configured to transmit the at least one flow reporting packet to a flow diagnostic recipient in accordance with the reporting policy.

Use cases for the smart sensing systems and methods described herein relate to, for example, DDoS attacks, TCP anomalies, workload anomalies, and network connected storage such as NVMe-oF. Non-limiting examples of some use cases are provided to disclose possible applications of smart sensing. Different environments can have different threshold values for the polices, can have other policies, etc. Use cases can indicate that network traffic flows are mirrored. Mirroring can be accomplished via ERSPAN or some other flow export protocol or technique. The mirroring can be started and stopped based on policies implemented by a network appliance configured for smart sensing as described herein. The workload traffic flows can include the workload packets 1021 described with reference to FIG. 9. The use cases described herein are non-limiting examples of a few of the capabilities of a network appliance configured to implement smart sensing as described herein.

With respect to high rate DDoS attacks, the network appliance can implement policies to start mirroring workload traffic flows when a workload connection rate exceeds 1000/sec and to stop mirroring when the workload connection rate drops below 100/sec.

With respect to slow rate DDoS attacks, the network appliance can implement policies to start mirroring workload traffic flows when workload sustained connections exceed 10000 and to stop mirroring when the workload sustained connections drops below 500.

With respect to TCP bandwidth anomalies, the network appliance can implement policies to start mirroring workload traffic flows when TCP bandwidth exceeds 10 Gbps and to stop mirroring when TCP bandwidth drops below 2.5 Gbps.

With respect to MTU (Maximum Transmission Unit) anomalies, the network appliance can implement policies to start mirroring workload traffic flows when MTU-sized packets exceed 70% of the total and to stop mirroring when MTU-sized packets drop below 30% of the total.

With respect to TCP-RTT anomalies, the network appliance can implement policies to start mirroring workload traffic flows when TCP-RTT exceeds 10 milliseconds and to stop mirroring when TCP-RTT drops below 1 millisecond.

With respect to TCP Setup/Teardown anomalies, the network appliance can implement policies to start mirroring workload traffic flows when TCP Setup/Teardown exceeds 40 milliseconds and to stop mirroring when TCP Setup/Teardown drops below 5 milliseconds.

With respect to workload compute usage anomalies, the network appliance can implement policies to start mirroring workload traffic flows when workload CPU usage exceeds 80% and to stop mirroring when workload CPU usage drops below 30%.

With respect to workload memory usage anomalies, the network appliance can implement policies to start mirroring workload traffic flows when workload memory usage exceeds 400 MB and to stop mirroring when workload memory usage drops below 70 MB.

With respect to TCP retransmit anomalies, the network appliance can implement policies to start mirroring workload traffic flows when TCP retransmits exceeds 10/sec and to stop mirroring when TCP retransmits is 0/sec.

With respect to packet normalization errors, the network appliance can implement policies to start mirroring workload traffic flows when packet normalization error exceeds 5/sec and to stop mirroring when packet normalization errors is 0/sec.

With respect to NVMe-oF, the use cases include security use cases, performance use cases, latency use cases, resource utilization use cases, and unusual behavior tracking use cases. Policies for monitoring and reporting malicious IO-write-transactions based on block-range-based checking can be used in security use cases. Policies for monitoring and reporting IO-read-rate, IO-write-rate, IO-read-bandwidth, and IO-write-bandwidth can be used in performance use cases. Policies for monitoring and reporting IO-read-latency, and IO-write-latency can be used in latency use cases. Policies for monitoring and reporting IO-read-sizes, and IO-write-sizes can be used in resource utilization use cases. Policies for monitoring and reporting IO-read-errors, and IO-write-errors can be used in unusual behavior tracking use cases.

Aspects described above can be ultimately implemented in a network appliance that includes physical circuits that implement digital data processing, storage, and communications. The network appliance can include processing circuits, ROM, RAM, CAM, and at least one interface (interface(s)). In an embodiment, the CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). In an embodiment, the network appliance may be embodied as a single IC device (e.g., fabricated on a single substrate) or the network appliance may be embodied as a system that includes multiple IC devices connected by, for example, a printed circuit board (PCB). In an embodiment, the interfaces may include network interfaces (e.g., Ethernet interfaces and/or InfiniBand interfaces) and/or PCI Express (PCIe) interfaces. The interfaces may also include other management and control interfaces such as I2C, general purpose I/Os, USB, UART, SPI, and eMMC.

As used herein the terms "packet" and "frame" may be used interchangeably to refer to a protocol data unit (PDU) that includes a header portion and a payload portion and that is communicated via a network protocol or protocols. In some embodiments, a PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the techniques are described herein in terms of processing packetized digital data as is common in digital communications networks, the techniques described herein are also applicable to processing digital data that is not packetized for digital communication using a network protocol. For example, the techniques described herein may be applicable to the encryption of data, redundant array of independent disks (RAID) processing, offload services, local storage operations, and/or segmentation operations. Although the techniques are described herein in terms of the P4 domain-specific language, the techniques may be applicable to other domain-specific languages that utilize a programmable data processing pipeline at the data plane.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method implemented by a network appliance that includes a control plane and a data plane, the method comprising:
    configuring, by the control plane, a packet processing circuit of the data plane to produce a plurality of output packets by processing a plurality of input packets of a network traffic flow;
    configuring, by the control plane, the data plane to measure a flow metric for the network traffic flow in accordance with a flow monitoring policy;
    configuring, by the control plane, the data plane to trigger a reporting policy in response to determining that a criterion is met by the network traffic flow;
    receiving, by the data plane, the input packets;
    processing, by the packet processing circuit, the input packets to produce the output packets;
    measuring, by the data plane, the flow metric for the network traffic flow;
    transmitting, by the data plane, the output packets;
    determining, by the data plane, that the criterion is met by the network traffic flow;
    triggering the reporting policy; and
    transmitting the flow metric to a flow diagnostic recipient, wherein
        the network appliance includes the control plane and the data plane,
        the data plane includes a timer block that produces a time value, and
        the data plane uses the time value to measure the flow metric.

2. The method implemented by the network appliance of claim 1, wherein the packet processing circuit measures the flow metric for the network traffic flow.

3. The method implemented by the network appliance of claim 1, wherein the packet processing circuit determines that the criterion is met by the network traffic flow.

4. The method implemented by the network appliance of claim 1, further including:
    configuring, by the control plane, the data plane to use a device sensor to measure a device metric of the network appliance,
    wherein
        the network appliance includes the device sensor that measures the device metric,
        the data plane uses the device sensor to measure the device metric in accordance with a device monitoring policy,
        the data plane triggers a second reporting policy in response to determining that the device metric meets a second criterion, and
        the network appliance sends the device metric to a device diagnostic recipient in accordance with the second reporting policy.

5. The method implemented by the network appliance of claim 1 wherein the packet processing circuit includes a packet processing pipeline that:
    includes a plurality of match action units;
    monitors the network traffic flow in accordance with an initial flow monitoring policy associated with the flow metric;
    triggers the flow monitoring policy in response to determining that an initial criterion is met by the network traffic flow; and
    initiates monitoring the network traffic flow in accordance with the flow monitoring policy.

6. The method implemented by the network appliance of claim 1 wherein:
    the packet processing circuit includes a packet processing pipeline that includes a plurality of match action units;
    the match action units measure the flow metric; and
    the match action units trigger the reporting policy.

7. The method implemented by the network appliance of claim 1 wherein the data plane produces an aggregation of a parameter by aggregating the parameter over time in accordance with the flow monitoring policy.

8. The method implemented by the network appliance of claim 7 wherein the aggregation of the parameter is transmitted to the flow diagnostic recipient.

9. The method implemented by the network appliance of claim 1 wherein the control plane configures the packet processing circuit to implement the flow monitoring policy and the reporting policy.

10. A network appliance comprising:
    a control plane; and
    a data plane that includes a packet processing circuit, wherein:
        the control plane configures the packet processing circuit to produce a plurality of output packets by processing a plurality of input packets of a network traffic flow,
        the control plane configures the data plane to measure a flow metric for the network traffic flow in accordance with a flow monitoring policy,
        the control plane configures the data plane to trigger a reporting policy in response to determining that a criterion is met by the network traffic flow,
        the data plane receives the input packets,
        the data plane processes the input packets to produce the output packets,
        the data plane transmits the output packets,
        the data plane measures the flow metric for the network traffic flow,
        the data plane triggers the reporting policy in response to determining that thecriterion is met by the network traffic flow,
        the network appliance sends the flow metric to a flow diagnostic recipient in accordance with the reporting policy,
        the data plane includes a timer block that produces a time value, and
        the data plane uses the time value to measure the flow metric.

11. The network appliance of claim 10, wherein:
    the packet processing circuit includes a match action pipeline;

the match action pipeline monitors the network traffic flows in accordance with the flow monitoring policy; and the match action pipeline determines that the criterion associated with the flow metric is met by the network traffic flow.

12. The network appliance of claim 10, wherein:

the packet processing circuit includes a match action pipeline;

the match action pipeline monitors the network traffic flow in accordance with an initial flow monitoring policy associated with the flow metric;

the match action pipeline triggers the flow monitoring policy in response to determining that an initial criterion is met by the network traffic flow; and the match action pipeline initiates monitoring the network traffic flows in accordance with the flow monitoring policy.

13. The network appliance of claim 10, wherein:

the data plane-includes a timer block;

the packet processing circuit includes a match-action pipeline;

the match-action pipeline produces an aggregation of the flow metric using the timer block by aggregating the flow metric over time in accordance with the flow monitoring policy; and the aggregation of the flow metric is sent to the flow diagnostic recipient.

14. The network appliance of claim 10, wherein:

the packet processing circuit includes a match-action pipeline;

the match-action pipeline produces an aggregation of the flow metric in accordance with the flow monitoring policy; and the aggregation of the flow metric is sent to the flow diagnostic recipient.

15. A network appliance comprising:

a means for receiving a plurality of input packets of a network traffic flow;

a means for transmitting a plurality of output packets of the network traffic flow;

a packet processing means for processing the input packets to produce the output packets;

a means for configuring the packet processing means to process the input packets and to measure a flow metric; and a timing means for producing a time value, wherein the packet processing means measures a flow metric of the network traffic flow in accordance with a flow monitoring policy, the packet processing means determines that a criterion is met by the network traffic flow, the packet processing means triggers a reporting policy in response to determining that the criterion is met by network traffic flow, the network appliance transmits the flow metric to a flow diagnostic recipient in accordance with the reporting policy, and the packet processing means uses the timing means to measure the flow metric.

16. The network appliance of claim 15 wherein the packet processing means includes a packet processing circuit that includes a plurality of match action units that measures the flow metric, determines that the criterion is met by the network traffic flow, and triggers the reporting policy.

* * * * *